United States Patent
Lee et al.

(10) Patent No.: US 11,678,161 B2
(45) Date of Patent: Jun. 13, 2023

(54) ELECTRONIC DEVICE FOR SUPPORTING WIRELESS MOBILE COMMUNICATION FOR VEHICLE AND OPERATION METHOD OF THE SAME

(71) Applicant: Samsung Electronics Co., Ltd., Gyeonggi-do (KR)

(72) Inventors: Jeonghoon Lee, Gyeonggi-do (KR); Houn Baek, Gyeonggi-do (KR); Woong Lee, Gyeonggi-do (KR); Jihyuk Lim, Gyeonggi-do (KR); Young Heo, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 289 days.

(21) Appl. No.: 17/013,951

(22) Filed: Sep. 8, 2020

(65) Prior Publication Data
US 2021/0076184 A1    Mar. 11, 2021

(30) Foreign Application Priority Data

Sep. 5, 2019    (KR) .......................... 10-2019-0110193

(51) Int. Cl.
*H04W 4/80* (2018.01)
*H04W 4/029* (2018.01)
(Continued)

(52) U.S. Cl.
CPC .............. *H04W 4/80* (2018.02); *G01S 19/51* (2013.01); *H04W 4/029* (2018.02); *H04W 4/40* (2018.02)

(58) Field of Classification Search
CPC ......... H04W 4/80; H04W 4/40; H04W 4/029; G01S 19/51
(Continued)

(56) References Cited

U.S. PATENT DOCUMENTS 8,909,165 B2 * 12/2014 Hendin ................. H04B 1/525
                                                         455/226.1
9,488,493 B2    11/2016 MacNeille et al.
(Continued)

FOREIGN PATENT DOCUMENTS

JP    5609487 B2    10/2014
KR    10-1898611 B1    9/2018
(Continued)

OTHER PUBLICATIONS

Qualcomm et al., 'WF on coexistence scenarios for NR V2X', R4-1905098, 3GPP TSG RAN WG4 Meeting #90bis, Xian, China, Apr. 15, 2019, slides 2-7.
(Continued)

*Primary Examiner* — William Nealon
(74) *Attorney, Agent, or Firm* — Cha & Reiter, LLC

(57) ABSTRACT

Provided are an electronic device for supporting vehicle-to-everything (V2X) communication on which an autonomous driving vehicle technology, a cooperative-intelligent transport systems (C-ITS) technology, etc. are based and an operation method of the electric device. The electronic device mounted to a vehicle to support wireless mobile communication for the vehicle includes: a dedicated short range communication (DSRC) module configured to perform wireless communication by using DSRC technology; a cellular V2X (C-V2X) module configured to perform wireless communication by using C-V2X technology; an antenna; and a processor configured to control a switch to connect one of the DSRC module and the C-V2X module to the antenna.

18 Claims, 12 Drawing Sheets

(51) Int. Cl.
  *H04W 4/40* (2018.01)
  *G01S 19/51* (2010.01)
(58) Field of Classification Search
  USPC .......................................................... 370/329
  See application file for complete search history.

(56) References Cited

U.S. PATENT DOCUMENTS

| | | | |
|---|---|---|---|
| 10,567,030 | B2 | 2/2020 | Spehl |
| 2010/0227570 | A1 | 9/2010 | Hendin |
| 2018/0049014 | A1 | 2/2018 | Patil et al. |
| 2019/0110178 | A1* | 4/2019 | Baghel .................... H04W 4/40 |
| 2019/0174344 | A1 | 6/2019 | Karella et al. |
| 2019/0296426 | A1* | 9/2019 | Sohn ........................ H01Q 5/50 |
| 2021/0056852 | A1* | 2/2021 | Lund ....................... G08G 1/163 |
| 2021/0360721 | A1* | 11/2021 | Andersson ............ H04W 76/16 |

FOREIGN PATENT DOCUMENTS

| | | | | |
|---|---|---|---|---|
| WO | 2019/006085 A1 | | 1/2019 | |
| WO | WO-2019006085 A1 * | | 1/2019 | ............ H04W 24/02 |
| WO | 2019/035753 A1 | | 2/2019 | |
| WO | WO-2019035753 A1 * | | 2/2019 | ............ H04L 69/14 |

OTHER PUBLICATIONS

Qualcomm Inc., 'On UE to UE Coexistence study of NR V2X at 5.9GHz', R4-1909923, 3GPP TSG RAN WG4 Meeting #92, Ljubljana, Slovenia, Aug. 16, 2019, sections 1-3.
Huawei et al., 'NR V2X co-existence simulation results for ITS spectrum case1 and case3', R4-1908971, 3GPP TSG RAN WG4 Meeting #92, Ljubljana, Slovenia, Aug. 16, 2019, sections 1-5 D.
International Search Report dated Dec. 11, 2020.
European Search Report dated Jan. 26, 2021.
Indian Office Action dated Aug. 3, 2022.
European Office Action dated Oct. 28, 2022.

* cited by examiner

ELECTRONIC DEVICE FOR SUPPORTING WIRELESS MOBILE COMMUNICATION FOR VEHICLE AND OPERATION METHOD OF THE SAME

CROSS-REFERENCE TO RELATED APPLICATION

This application is based on and claims priority under 35 U.S.C. § 119 to Korean Patent Application No. 10-2019-0110193, filed on Sep. 5, 2019, in the Korean Intellectual Property Office, the disclosure of which is incorporated by reference herein in its entirety.

BACKGROUND

1. Field

One or more embodiments of the instant disclosure generally relate to electronic devices for supporting vehicle-to-everything (V2X) communication, which serves as a basis for autonomous driving vehicle technology, cooperative-intelligent transport systems (C-ITS) technology, etc., and operation methods of the electric devices.

2. Description of Related Art

Vehicle-to-everything (V2X) communication technology is a technology that allows vehicles to exchange information with entities such as other vehicles, mobile devices, electronic components embedded in roads, etc. via wired or wireless networks.

V2X communication technology is split into two main communication technologies: dedicated short range communication (DSRC) technology and cellular V2X (C-V2X) technology. DSRC and C-V2X technologies use the same 5.9 GHz band, but they are based on different technical standards. DSRC technology is based on the IEEE 802.11 standard, while C-V2X is based on cellular communication standards such as third-generation (3G), fourth-generation (4G), and fifth-generation (5G) standards.

In a geographical area where different V2X communication technologies, e.g., DSRC and C-V2X technologies, are combined and used or where regions using the two different V2X communication technologies are located adjacent to each other, there may be a need to be able to quickly switch between the two V2X communication technologies for better V2X communication performance, while supporting both V2X communication technologies. However, technologies that have been developed so far assume that one or the other of the two V2X communication technologies is selectively used depending on the country or region, such that the two V2X communication technologies are not used simultaneously in the same region. Thus, a method of switching between different V2X communication technologies has not been considered.

SUMMARY

In an electronic device mounted to a vehicle to support both dedicated short range communication (DSRC) technology and cellular vehicle-to-everything (C-V2X) technology, the area occupied by devices such as antennas mounted in the vehicle and cost of the antennas need to be reduced. According to certain embodiments of the instant disclosure, these reductions may be accomplished by switching between the DSRC and C-V2X technologies and using a shared antenna for DSRC and C-V2X.

Additional aspects will be set forth in part in the description which follows and, in part, will be apparent from the description, or may be learned by practice of the presented embodiments of the disclosure.

According to an embodiment of the disclosure, an electronic device mounted to a vehicle to support wireless mobile communication for the vehicle includes: a DSRC module configured to perform wireless communication by using DSRC technology; a C-V2X module configured to perform wireless communication by using C-V2X technology; an antenna; and a processor configured to control a switch to connect the DSRC module or the C-V2X module to the antenna.

According to another embodiment of the disclosure, an operation method of an electronic device mounted to a vehicle to support wireless mobile communication for the vehicle includes: selecting a module from a DSRC module configured to perform wireless communication by using DSRC technology and a C-V2X module configured to perform wireless communication by using C-V2X technology; controlling a switch to connect the selected module to an antenna; and performing V2X communication via the selected module.

According to another embodiment of the disclosure, one or more computer-readable recording media have stored therein programs for performing an operation method of an electronic device mounted to a vehicle to support a wireless mobile communication for the vehicle, the operation method including: selecting a module from a DSRC module configured to perform wireless communication by using DSRC technology and a C-V2X module configured to perform wireless communication by using C-V2X technology; controlling a switch to connect the selected module to an antenna; and performing V2X communication via the selected module.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
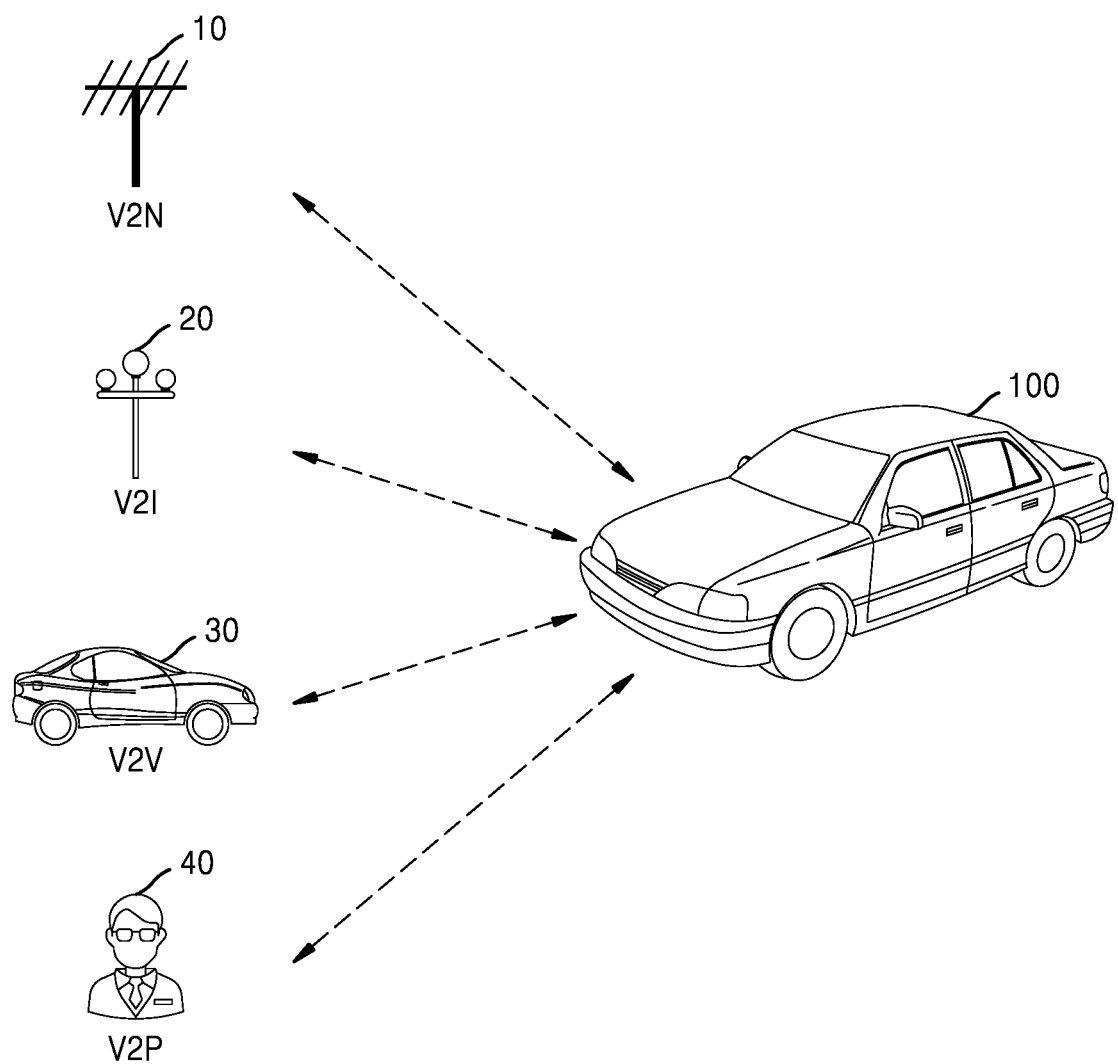
FIG. 1 is a diagram for explaining a vehicle-to-everything (V2X) technology.

Embodiments of the disclosure will now be described more fully hereinafter with reference to the accompanying drawings so that they may be easily implemented by those of ordinary skill in the art. However, embodiments of the disclosure may have different forms and should not be construed as being limited to the embodiments of the disclosure set forth herein. In addition, parts not related to the disclosure are omitted to clarify the description of the embodiments of the disclosure, and like reference numerals in the drawings denote like elements throughout.

Some embodiments of the disclosure may be described in terms of functional block components and various processing operations. Some or all of such functional blocks may be implemented by any number of hardware and/or software components that perform specific functions. For example, functional blocks of the disclosure may be implemented by one or more microprocessors or by circuit components for performing certain functions. For example, functional blocks according to the disclosure may be implemented with any programming or scripting language. The functional blocks may be implemented using various algorithms executed on one or more processors. Furthermore, the disclosure may employ techniques of the related art for electronics configuration, signal processing and/or data processing.

Furthermore, connecting lines or connectors shown in various figures are intended to represent exemplary functional relationships and/or physical or logical couplings between components in the figures. In an actual device, connections between components may be represented by alternative or additional functional relationships, physical connections, or logical connections.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

FIG. 1 is a diagram for explaining V2X technology.

V2X, which again stands for a vehicle-to-everything, refers to exchanging of information between a vehicle and another entity or the technology enabling such exchange of information therebetween. As shown in FIG. 1, V2X communication technology may enable wireless communication between a vehicle 100 and a network 10 (vehicle-to-network (V2N) communication), wireless communication between the vehicle 100 and an infrastructure 20 (vehicle-to-infrastructure (V2I) communication), wireless communication between the vehicle 100 and another vehicle 30 (vehicle-to-vehicle (V2V) communication), wireless communication between the vehicle 100 and a pedestrian 40 (vehicle-to-pedestrian (V2P) communication), etc.

As mentioned above, V2X communication technology includes dedicated short range communication (DSRC) technology and cellular V2X (C-V2X) technology. Conventionally, only one of DSRC and C-V2X technologies is selected and used in a particular country or region. However, in a geographical area where different V2X communication technologies, e.g. DSRC and C-V2X, are combined and used or where regions using different V2X communication technologies are located adjacent to each other, a vehicle supporting both V2X communication technologies may be used for better V2X communication performance. Because both V2X communication technologies use the same 5.9 GHz frequency band, when the two V2X communication technologies are performed simultaneously, two or more different antennas need to be used. However, when V2X communications via the two V2X communication technologies are performed by using two or more different antennas, this may result in significant performance degradation due to mutual interference.

Thus, an electronic device mounted to a vehicle to support wireless mobile communication for the vehicle according to an embodiment of the disclosure may be configured to efficiently perform a switching operation for switching either of the two V2X communication technologies on or off while supporting the two V2X communication technologies. Accordingly, acceptable V2X performance may be provided, and a space occupied by antennas and cost of the antennas may be reduced because the antennas are shared between the two communication technologies.

Figure 2:
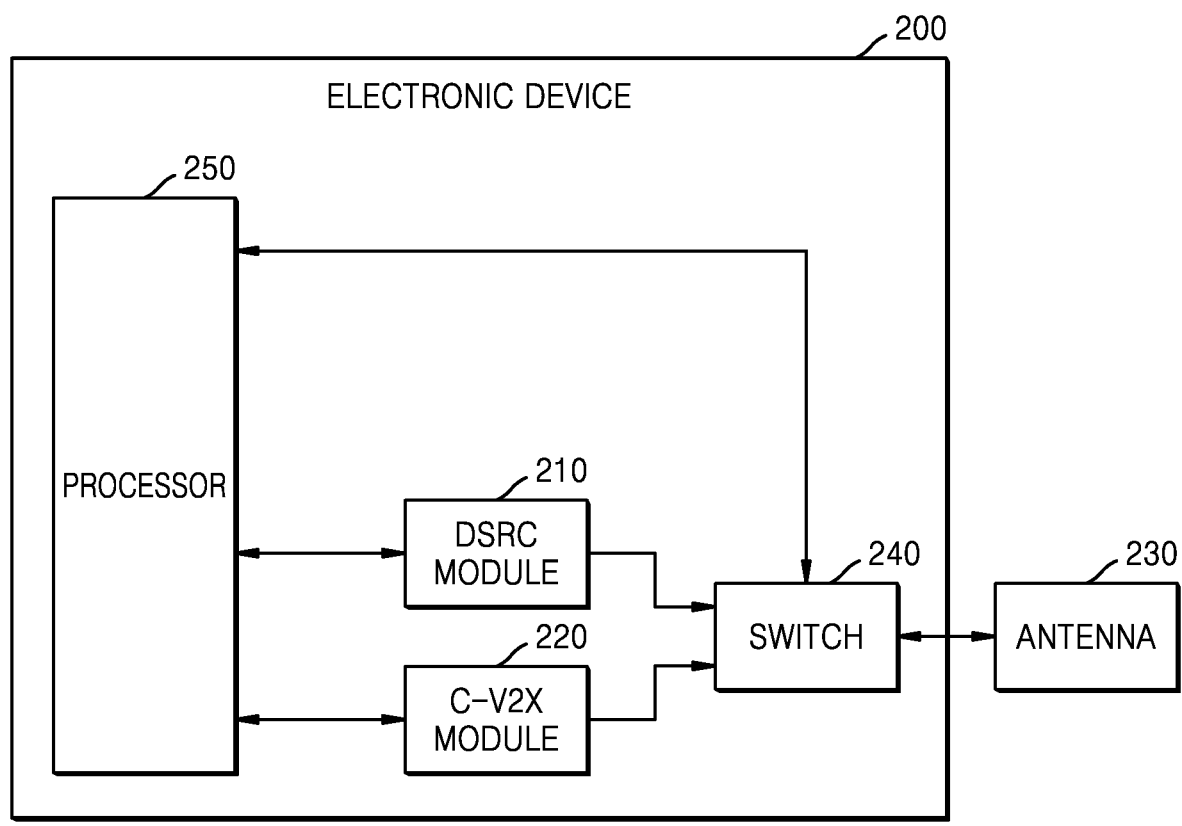
FIG. 2 is a block diagram of an electronic device according to an embodiment of the disclosure.

FIG. 2 is a block diagram of an electronic device 200 according to an embodiment of the disclosure.

According to an embodiment of the disclosure, the electronic device 200 may include a telematics control unit (TCU) embedded in the vehicle to support wireless mobile communication for the vehicle. Telematics is a wireless communication technology that provides various pieces of information and diverse services for the vehicle, and the TCU is a cellular communication device that includes a plurality of communication modules and is installed in the vehicle.

According to an embodiment of the disclosure, the electronic device 200 may include a DSRC module 210 for performing wireless communication using DSRC technology and a C-V2X module 220 for performing wireless communication using C-V2X technology. Each of the DSRC module 210 and the C-V2X module 220 may include a V2X modem and a radio frequency (RF) transceiver.

According to an embodiment of the disclosure, the electronic device 200 may include a processor 250 for controlling a switch 240 to connect either of the DSRC module 210 or the C-V2X module 220 to the antenna 230. The switch 240 may be an RF switch for connecting the DSRC module 210 and the C-V2X module 220 to the antenna 230. The antenna 230 may be one or a pair of antenna modules.

As shown in FIG. 2, the antenna 230 may be located outside the electronic device 200. For example, the electronic device 200 may be located inside the vehicle while the antenna 230 may be located outside the vehicle. The electronic device 200 may be connected to the antenna 230 via a 5.9 GHz coaxial cable. However, embodiments of the disclosure are not limited thereto, and the antenna 230 may be included inside the electronic device 200.

The processor 250 controls some or all operations of the electronic device 200. The processor 250 may control components included in the electronic device 200 such that the electronic device 200 may perform wired/wireless communication for the vehicle. The processor 250 may perform operations such as generation and interpretation of commands for driving the electronic device 200, arithmetic computations, control, etc. The processor 250 may include a central processing unit (CPU) for processing data and a graphics processing unit (GPU) for processing image information. Furthermore, the processor 250 may support communication interfaces such as universal serial bus (USB), peripheral component interconnect (PCI), universal asynchronous receiver/transmitter (UART), or general-purpose input/output (GPIO). In addition, the processor 250 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Although FIG. 2 shows the electronic device 200 including one processor, embodiments of the disclosure are not limited thereto, and the electronic device 200 may include a plurality of processors. At least some of the operations and functions of the processor 250, which will be described below, may be performed by a plurality of processors.

According to an embodiment of the disclosure, the antenna 230 may be an antenna module further including a power amplifier (PA)/low noise amplifier (LNA) for signal compensation, a switch for branching a signal, and a power detector circuit for providing feedback with respect to power control.

In addition, according to an embodiment of the disclosure, the antenna 230 may include a pair of sub-antennas for diversity transmission and diversity reception. However, embodiments of the disclosure are not limited thereto, and the antenna 230 may include three or more sub-antennas. The switch 240 may receive two output signals from the DSRC module 210 for the pair of sub-antennas and two output signals from the C-V2X module 220 for the pair of sub-antennas and selectively output the two signals to the pair of sub-antennas.

The aforementioned diversity scheme is a communication scheme using two or more antennas that may eliminate or reduce fading that occurs during propagation of radio waves and may enable communication with stronger and constant signal strength. This is accomplished by combining together outputs of two or more received signals. Transmission and reception performance in the diversity transmission/reception scheme, accomplished by transmitting or receiving the same signal via two or more antennas, may be more than twice better than the transmission and reception performance achieved with the use of a single antenna.

According to an embodiment of the disclosure, the processor 250 may select an optimal V2X communication technology according to various determination criteria and perform V2X communication by using the selected V2X communication technology. For example, the processor 250 may select an optimal V2X communication technology based on location information of the vehicle, information about a base station connected for cellular communication, comparing periodically found DSRC and C-V2X signals, or surrounding environment information. Alternatively, the processor 250 may select a V2X communication technology based on a user input and perform V2X communication by using the selected V2X communication technology.

For example, according to an embodiment of the disclosure, the processor 250 may select either the DSRC module 210 or the C-V2X module 220 based on location information of the vehicle equipped with the electronic device 200 and control the switch 240 to connect the selected V2X module to the antenna 230. For example, the location information of the vehicle may include a global positioning system (GPS) signal for the vehicle. The processor 250 may select, based on information about the V2X communication technology corresponding to the location of the vehicle and the location information of the vehicle, either the DSRC module 210 or the C-V2X module 220 as the module for V2X communication for the particular current location of the vehicle.

Figure 3A:
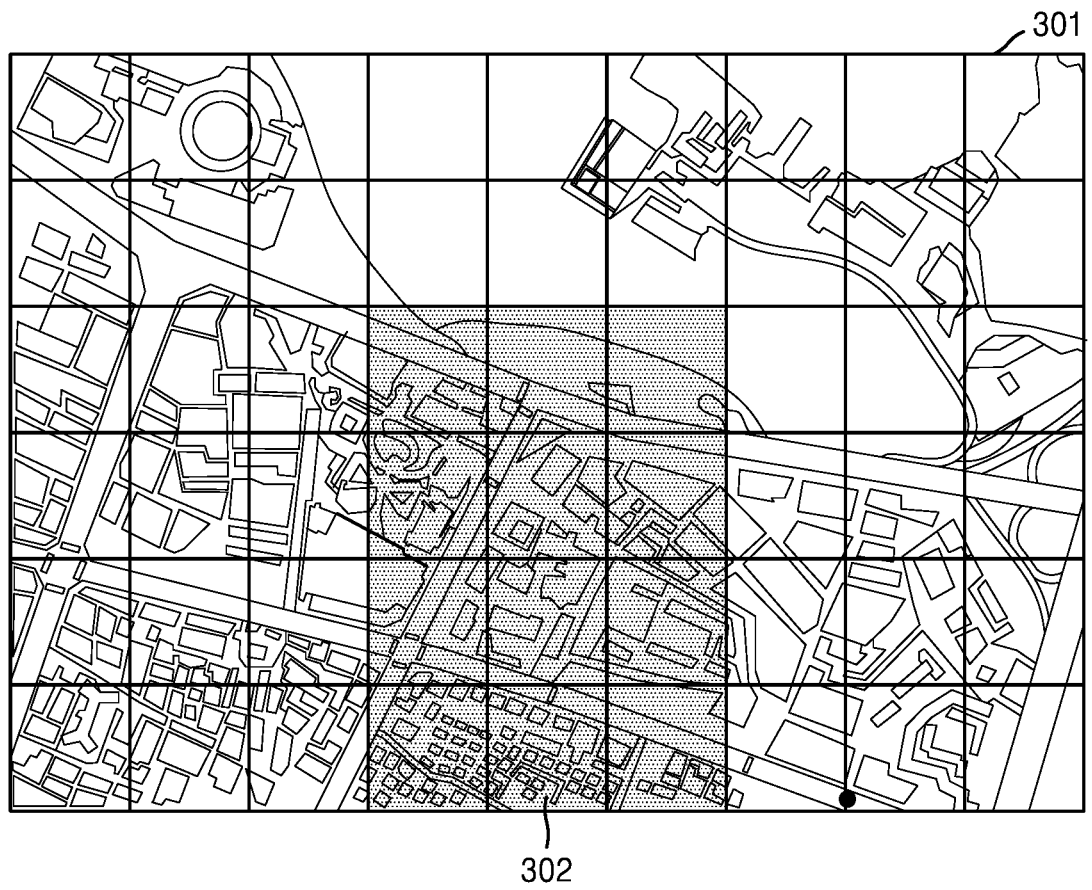
FIG. 3A is a view for explaining a method, performed by an electronic device, of selecting a V2X communication technology based on location information of a vehicle, according to an embodiment of the disclosure.

FIG. 3A is a view illustrating an example in which a vehicle equipped with the electronic device 200 travels in a geographical area in which a region 301 supporting DSRC technology is adjacent to a region 302 supporting C-V2X technology. According to an embodiment of the disclosure, the electronic device 200 may obtain information about the V2X communication technology corresponding to the location of the vehicle from an internal memory or an external server. The information about the V2X communication technology corresponding to the location of the vehicle may include information about whether the region where the vehicle is located supports DSRC or C-V2X technology. The electronic device 200 may determine the location of the vehicle based on a received GPS signal and select a V2X module, i.e., the DSRC module 210 or the C-V2X module 220, based on the V2X communication technology supported in the region corresponding to the location of the vehicle. The electronic device 200 may perform V2I communication with an infrastructure included in the region corresponding to the location of the vehicle by using the selected V2X module.

In another example, according to an embodiment of the disclosure, the processor 250 may select the DSRC module 210 or the C-V2X module 220 based on information about a base station that performs cellular communication with the electronic device 200. The information about the base station may include location information of the base station, identification information of the base station, identification information of neighboring base stations, etc. The processor 250 may control the switch 240 to connect the antenna 230 to the DSRC module 210 or the C-V2X module 220. The processor 250 may select, based on information about the V2X communication technology corresponding to the base station, either the DSRC module 210 or the C-V2X module 220 as the module for V2X communication with the base station.

Figure 3B:
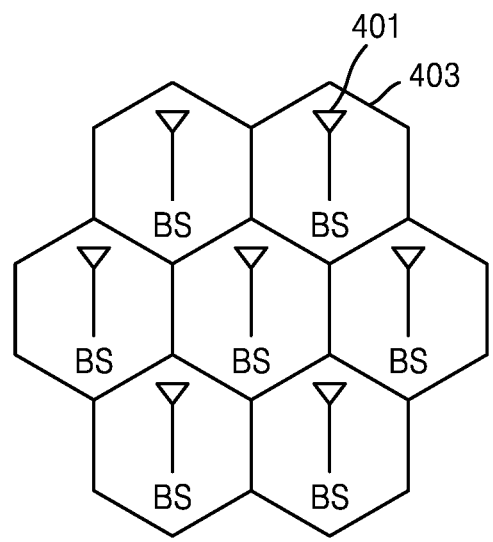
FIG. 3B is a view for explaining a method, performed by an electronic device, of selecting a V2X communication technology based on base station information, according to an embodiment of the disclosure.

FIG. 3B is a view illustrating a cell 403 obtained by partitioning a coverage area for cellular communication and a base station 401 installed in the cell 403. According to an embodiment of the disclosure, the electronic device 200 may obtain information about the V2X communication technology corresponding to the base station 401 from an internal memory or an external server. The information about the V2X communication technology corresponding to the base station 401 may include information about whether the area within coverage of the base station 401 supports DSRC or C-V2X technology. The electronic device 200 may determine the base station 401 connected for cellular communication and select a module from the DSRC module 210 and the C-V2X module 220 based on the V2X communication technology corresponding to the determined base station 401. The electronic device 200 may perform V2I communication with an infrastructure included in the area within the coverage of the base station 401 by using the selected V2X module.

In another example, according to an embodiment of the disclosure, when a vehicle equipped with the electronic device 200 travels in an area where the two different V2X technologies, i.e., DSRC and C-V2X, are simultaneously used, the electronic device 200 may switch to a V2X technology that provides better V2X communication performance by periodically searching for a DSRC signal received via DSRC and a C-V2X signal received via C-V2X.

According to an embodiment of the disclosure, the processor 250 may select a module from the DSRC module 210 and the C-V2X module 220 by periodically comparing a DSRC signal received via the DSRC module 210 with a C-V2X signal received via the C-V2X module 220. The processor 250 may control the switch 240 to connect the antenna 230 to the DSRC module 210 or the C-V2X module 220 based on the comparison. The processor 250 may select the DSRC module 210 or the C-V2X module 220 based on comparing attributes such as packet error rate (PER), packet reception rate (PRR), latency, and strength of each of the DSRC signal and the C-V2X signal.

PER may represent a ratio, expressed as a percentage, of the number of missed packets at the receiver to a total number of packets queued at the transmitter. PRR may represent a ratio, expressed as a percentage, of the number of packets received from a particular transmitter to a total number of packets queued at the transmitter. The relationship PRR=1−PER may be established. Latency may represent a time interval, expressed in milliseconds (msec), between the time instant when a transmitter application delivers an application layer packet (e.g., basic safety message (BSM)) to a lower layer and the time instant when the application layer packet is received by an application layer at the receiver.

According to an embodiment of the disclosure, the processor 250 may control the switch 240 to perform diversity communication with one of the DSRC module 210 and the C-V2X module 220 by using a pair of sub-antennas included in the antenna 230.

According to an embodiment of the disclosure, the processor 250 may perform diversity V2X communication via one V2X communication technology by operating both of the pair of sub-antennas while periodically searching for a V2X signal by using the other V2X communication technology.

For example, when the processor 250 searches for a V2X signal received via the second V2X communication technology other than a first V2X communication technology currently being used, the processor 250 may operate one sub-antenna to maintain communication while searching for the V2X signal received via the second V2X communication technology by using the other sub-antenna. The processor 250 may compare a first signal received via the first V2X communication technology with a second signal received through the second V2X communication technology and select one of the first and second V2X communication technologies based on the result of the comparison. The processor 250 may determine whether to maintain the first V2X communication technology or to switch to the second V2X communication technology. The processor 250 may perform diversity V2X communication using the selected V2X communication technology based on the result of the determination.

For example, the processor 250 may perform V2X communication via DSRC technology by using a pair of sub-antennas. The processor 250 may control the switch 240 to receive, at preset time periods, a DSRC signal via the first one of the pair of sub-antennas and a C-V2X signal via a second one of the pair of sub-antennas. The processor 250 may determine whether to change from the DSRC technology to C-V2X technology based on the result of comparing the DSRC signal with the C-V2X signal. When changing is determined to be appropriate, the processor 250 may change DSRC technology to C-V2X technology and perform V2X communication via the C-V2X technology by using the pair of sub-antennas.

As another example, according to an embodiment of the disclosure, the processor 250 may select a V2X module from the DSRC module 210 and the C-V2X module 220 based on surrounding environment information of the vehicle equipped with the electronic device 200 and control the switch 240 to connect the selected V2X module to the antenna 230. For example, the surrounding environment information of the vehicle may include a captured image of the surrounding environment of the vehicle or depth information obtained by sensing the depth of an object located in the vicinity of the vehicle. The processor 250 may obtain the image by capturing the vehicle's surrounding environment using a camera and identify entities supporting V2I communication with the vehicle in the obtained image. For example, the entities supporting V2I communication with the vehicle may include facilities such as traffic lights or street lights installed on or around the road and a base station. The processor 250 may select a module from the DSRC module 210 or the C-V2X module 220 as the module supporting V2X communication depending on the identified entities. According to an embodiment of the disclosure, the electronic device 200 may use conventional artificial intelligence (AI) techniques to identify entities in the image.

Figure 4:
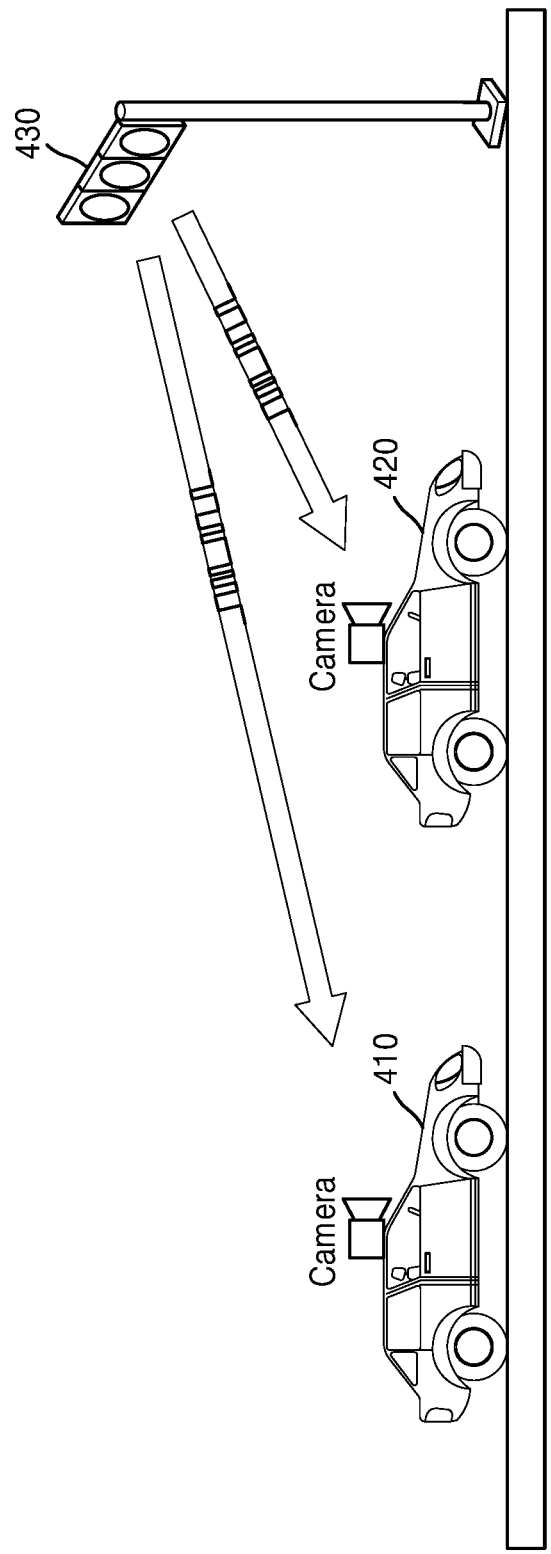
FIG. 4 is a view for explaining a method, performed by an electronic device, of selecting a V2X communication technology based on surrounding environment information, according to an embodiment of the disclosure.

FIG. 4 is a view illustrating an example in which a traffic light 430 supporting V2I communication is in communication with a vehicle. A vehicle equipped with the electronic device 200 may obtain an image of the vehicle's surroundings via a camera installed in the vehicle and determine surrounding situations through image processing. The electronic device 200 may operate to recognize that the vehicle is approaching the traffic light 430 from the obtained image and preferentially receive a V2X signal (e.g., a C-V2X signal) from the traffic light 430.

For example, the electronic device 200 mounted to the vehicle may perform V2X communication by using DSRC technology at a first location 410. The electronic device 200 may recognize that the vehicle is approaching the traffic light 430 by analyzing images or signals obtained by the camera or LIDAR and select the C-V2X module 220 based on the result of the recognition. The electronic device 200 may then perform V2X communication by using C-V2X technology at a second location 420.

Furthermore, stable V2X communication is required in order for the electronic device 200 to seamlessly provide information and services for the vehicle. Thus, according to an embodiment of the disclosure, when V2X communication via a given V2X communication technology is interrupted, the processor 250 may quickly switch to the other V2X communication technology to continuously perform the V2X communication.

The processor 250 may detect interruption of wireless communication using the V2X communication technology in service. The processor 250 may periodically determine whether wireless communication via the V2X communication technology is normally performed. It is determined, based on the strength of a transmitted or received signal, whether the wireless communication is normally performed. Alternatively, the processor 250 may detect interruption of wireless communication by receiving a data signal including information indicating interruption of the wireless communication. When communication via a given V2X communication technology is interrupted or aborted, the processor 250 may search for a signal by using the other V2X communication technology. The processor 250 may determine, based on a found signal, whether it is appropriate to continuously perform V2X communication by switching to the other V2X communication technology. For example, when the strength of the found signal is greater than or equal to a threshold value, the processor 250 may determine that switching to the other V2X communication technology is appropriate.

Alternatively, the processor 250 may determine whether to switch the V2X communication technology based on location information of the vehicle or information about a base station. For example, the processor 250 may determine that switching to the other V2X communication technology is appropriate when it is determined that the area where the vehicle is located or the area within coverage of the base station supports the other V2X communication technology.

When the processor 250 determines that switching the V2X communication technology is desirable, the processor 250 may continuously perform V2X communication by switching to the other V2X communication technology. On the other hand, when the processor 250 determines that switching the V2X communication technology is not desirable, the processor 250 may perform an operation for reactivating a session using the currently-used V2X technology to maintain the use of the V2X communication technology used for the interrupted communication or wait for a preset time period until the interruption problem is solved.

Figure 5A:
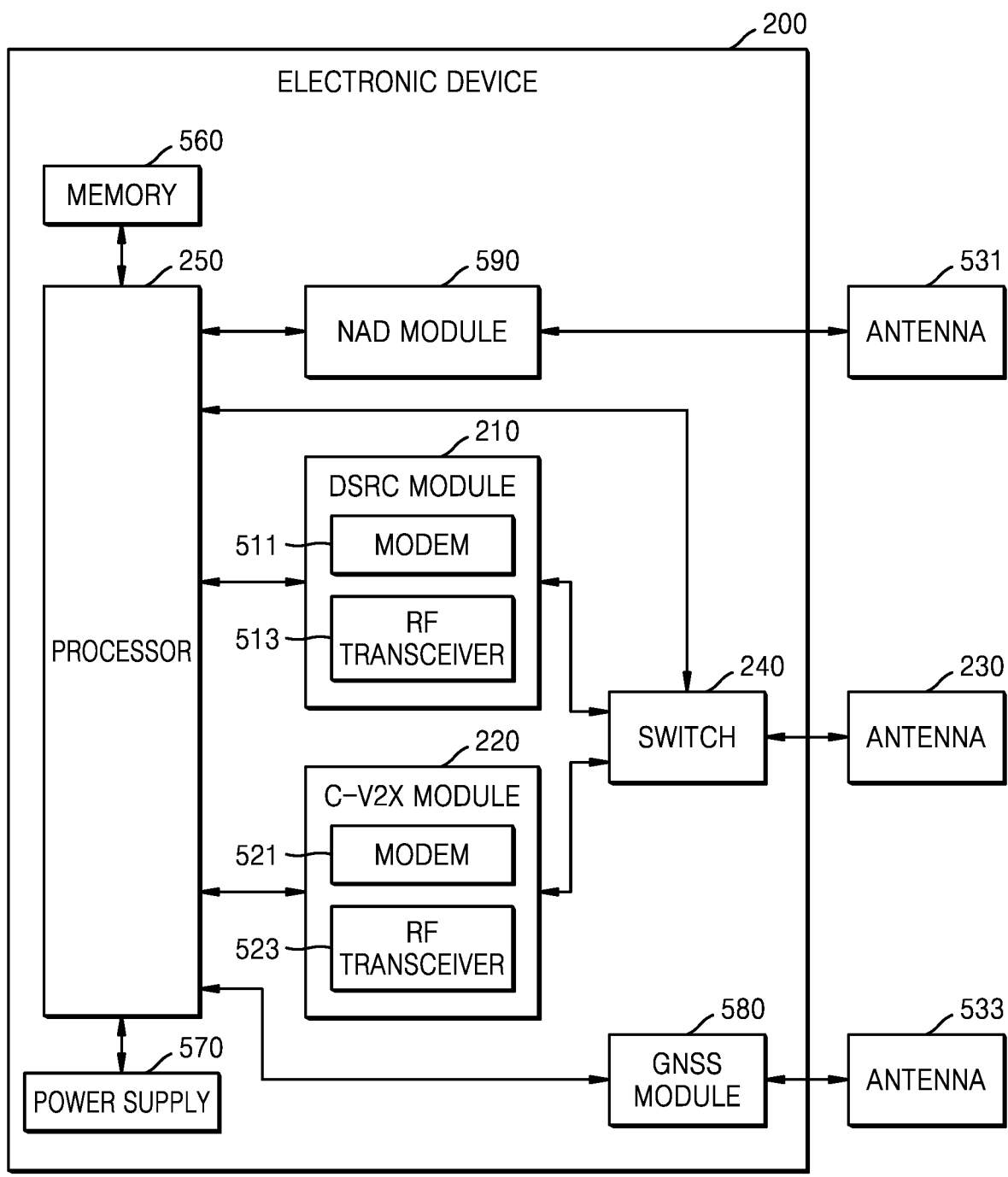
FIG. 5A is a detailed block diagram of an electronic device according to embodiment of the disclosure.

Moreover, according to an embodiment of the disclosure, the electronic device 200 may be implemented by more components than those illustrated in FIG. 2. Referring to FIG. 5A, the electronic device 200 according to an embodiment of the disclosure may further include a memory 560, a power supply 570, a global navigation satellite system (GNSS) module 580, a network access device (NAD) module 590, and antennas 531 and 533.

According to an embodiment of the disclosure, the memory 560 may store instructions executed by the processor 250 to control the electronic device 200, AI models, information processed by the processor 250, information received from an external server or another electronic device, etc. For example, the memory 560 may store at least one of information about the V2X communication technology for one or more geographical areas and information about the V2X communication technology for one or more base stations.

While FIG. 5A shows that the electronic device 200 includes the memory 560, embodiments of the disclosure are not limited thereto, and the electronic device 200 may include a plurality of memories. For example, the memory 560 may include double data rate synchronous dynamic random access memory (DDR SDRAM) and flash memory such as an embedded multimedia card (eMMC).

According to an embodiment of the disclosure, the power supply 570 may receive a constant power input and convert the power into higher or lower voltages to be output in order to supply different power levels to modules included in the electronic device 200.

According to an embodiment of the disclosure, the GNSS module 580 is a receiver module in a system that uses satellites to enable determination of the location of the GNSS module 580, which in this case is co-located with the vehicle shown in FIG. 4, for example. The GNSS module 580 may receive information such as location information (e.g., longitude and latitude) and a map of a surrounding area from each satellite and help a vehicle's navigation system determine a vehicle's route to a destination. The GNSS module 580 may receive radio waves transmitted from each satellite and calculate the distance from the satellite to determine a location of the vehicle.

According to an embodiment of the disclosure, the NAD module 590 may connect the electronic device 200 to a network. The NAD module 590 may include a modem, an RF transceiver, and a front-end circuit for cellular communication (e.g., second-generation (2G), third-generation (3G), fourth-generation (4G), fifth-generation (5G), etc.).

When the electronic device 200 includes a module such as the GNSS module 580 or the NAD module 590, the electronic device 200 may further include the antennas 531 and 533. The electronic device 200 may include a plurality of antennas operating in different frequency bands that correspond to the types of communication technology used.

In addition, as shown in FIG. 5A, the C-V2X module 220 may include a V2X modem 521 and an RF transceiver 523 based on cellular communication technology. The DSRC module 210 may include a V2X modem 511 and an RF transceiver 513 based on the IEEE 802.11 standard.

Figure 5B:
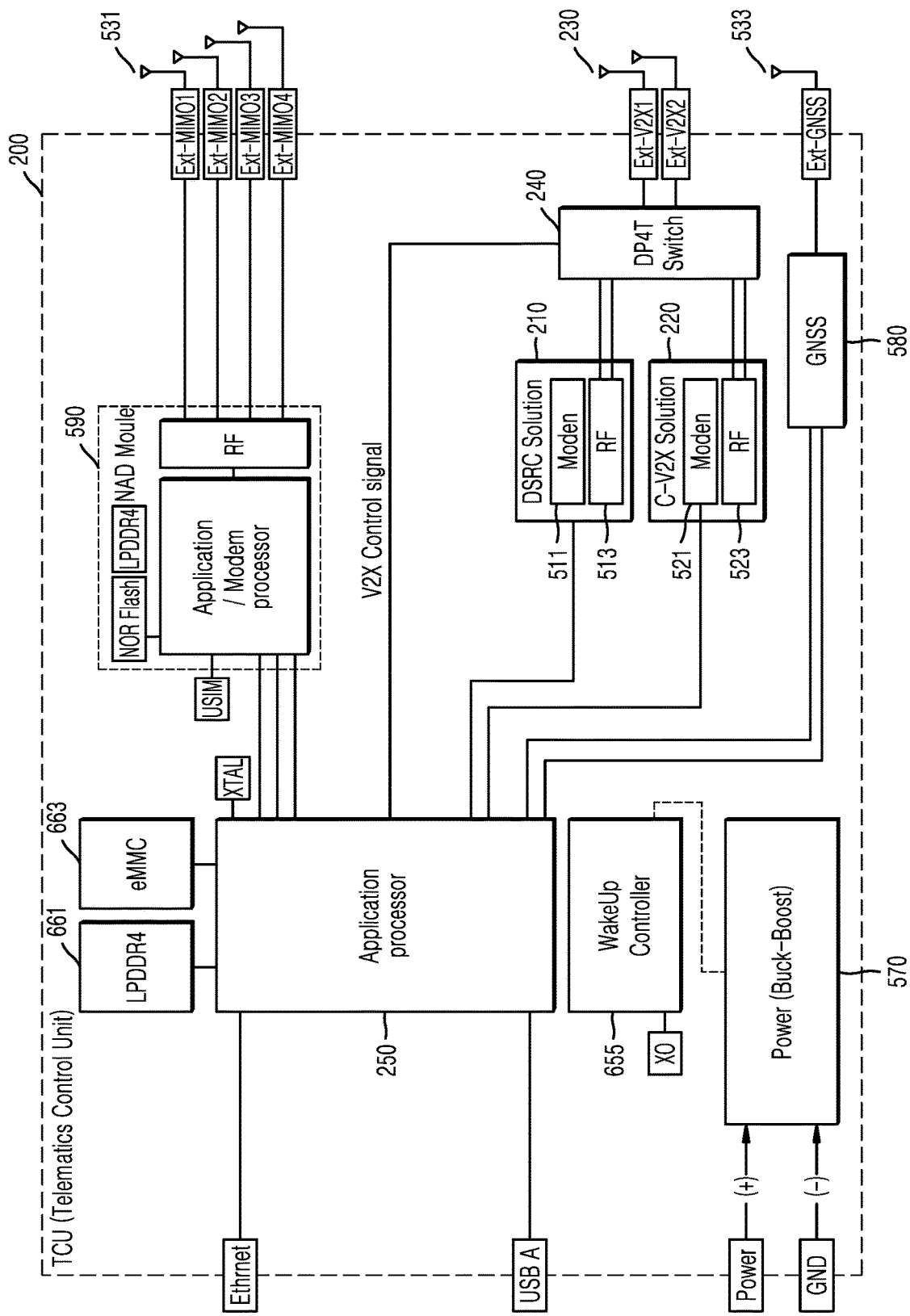
FIG. 5B is a detailed block diagram of an electronic device according to embodiment of the disclosure.

FIG. 5B is a detailed block diagram of the electronic device 200 according to an embodiment of the disclosure. Referring to FIG. 5B, the electronic device 200 according to the embodiment of the disclosure may further include a wake-up controller 655.

The wake-up controller 655 determines the operational state and the sleep state of the electronic device 200 and/or at least some modules included in the electronic device 200.

According to an embodiment of the disclosure, the electronic device 200 may include low-power DDR4 (LPDDR4) 661 and an eMMC 663 as the memory. The LPDDR4 661 is DDR SDRAM memory, and the eMMC 663 is flash memory.

A dual-pole four-throw (DP4T) switch is a switch with two inputs and four outputs. As shown in FIG. 5B, according to an embodiment of the disclosure, the switch 240 of the electronic device 200 may be a DP4T switch that receives four inputs from V2X modules, i.e., the C-V2X solution 220 and the DSRC solution 210, and selectively outputs two signals to a pair of sub-antennas.

Figure 6:
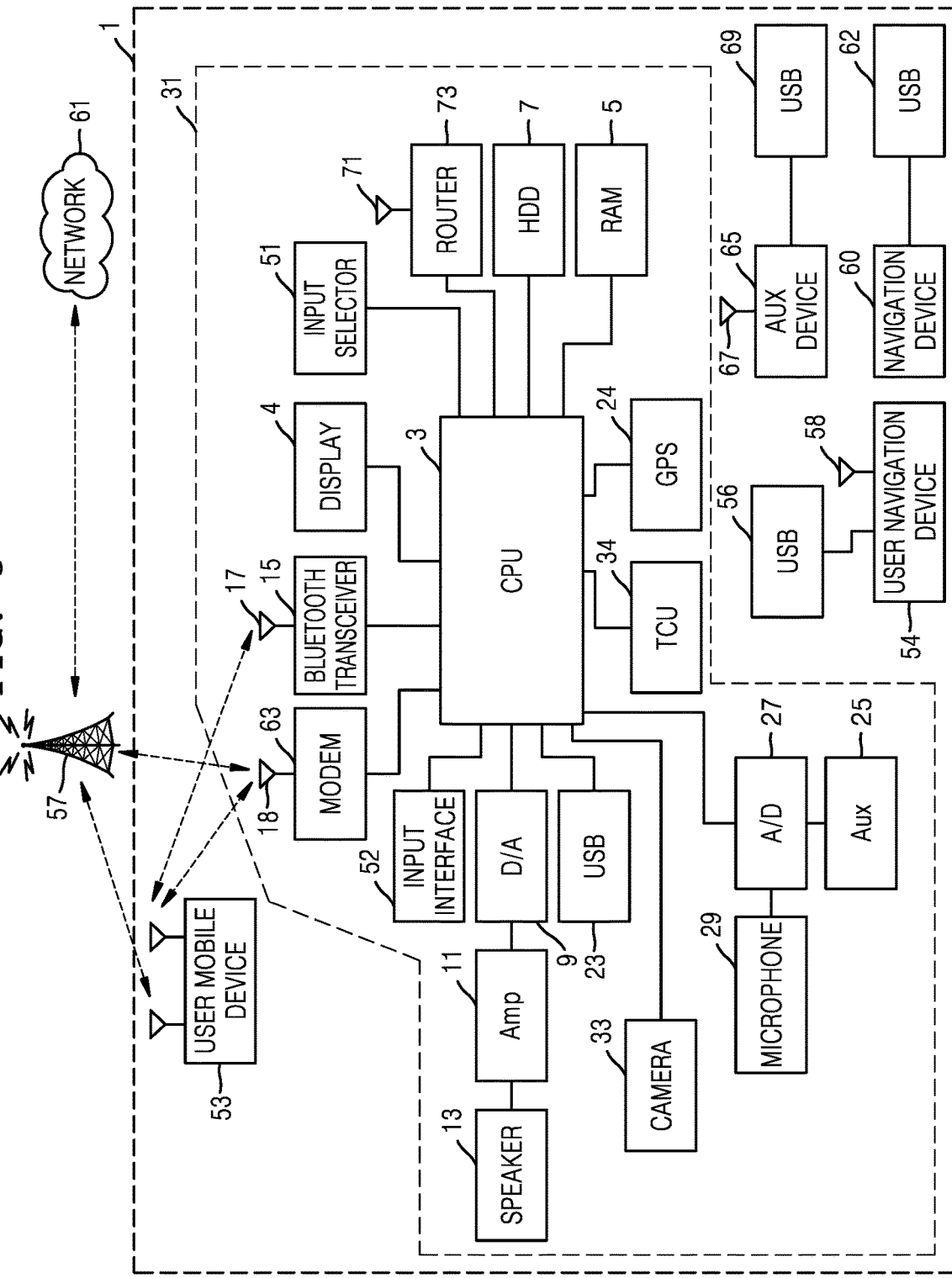
FIG. 6 is a detailed block diagram of a vehicle-based computing system according to an embodiment of the disclosure.

FIG. 6 is a block diagram of a vehicle-based computing system 1 according to an embodiment of the disclosure. The vehicle-based computing system 1 refers to a set of electronic devices that control driving of a vehicle, transmit or receive data regarding the vehicle, or control operations of one or more auxiliary devices of the vehicle (e.g., opening and closing of a window or door). The electronic device included in the vehicle-based computing system 1 may be a device mounted to the vehicle, a device connected via a wire or wirelessly to a device mounted to the vehicle, or a device located near the vehicle. The vehicle-based computing system 1 of FIG. 6 may include the electronic device 200 illustrated in FIG. 2, 5A, or 5B.

Not all the components shown in FIG. 6 are essential components, and the vehicle-based computing system 1 may include fewer or more components than those shown in FIG. 6.

The vehicle-based computing system 1 of FIG. 6 may include a TCU 34 according to an embodiment of the disclosure. The TCU 34 may be configured to support wireless mobile communication for the vehicle. The TCU 34 may include at least some components of the electronic device 200 of FIG. 2, 5A, or 5B.

At least some of the operations and functions performed by the processor 250 of FIG. 2 or 5A or the processor 250 of FIG. 5B may be performed by a CPU 3 of FIG. 6. However, embodiments of the disclosure are not limited thereto, and the TCU 34 may include a separate processor for controlling the operations of the TCU 34. Furthermore, each component included in the electronic device 200 of FIG. 2, 5A, or 5B may be included in the TCU 34 of FIG. 6, or may be located outside the TCU 34 and connected to the TCU 34. For example, the memory 560 of FIG. 5A may correspond to a hard disk drive (HDD) 7 or random access memory (RAM) 5 of FIG. 6, and the NAD module 590 of FIG. 5A may correspond to a modem 63 of FIG. 6. Furthermore, the GNSS module 580 of FIG. 5A may correspond to a GPS 24 of FIG. 6.

The vehicle-based computing system 1 may include various modules for obtaining information about conditions inside or outside the vehicle. For example, the vehicle-based computing system 1 may include a camera 33, a microphone 29, an input interface 52, etc. The vehicle-based computing system 1 may further include a communication module for receiving information from the outside, various sensors (e.g., a radar sensor, a LIDAR sensor, etc.) for obtaining information about the environment outside the vehicle, and various sensors for obtaining information about conditions inside the vehicle.

The camera 33 is used for inputting a video signal and may process image frames as still images or videos obtained by an image sensor. The image frames processed by the camera 33 may be stored in a memory or transmitted to an external device or server via the communication module. According to an embodiment of the disclosure, the camera 33 may include two or more cameras. For example, the camera 33 may be implemented in various forms, such as a front camera, a rear camera, a left camera, a right camera, an internal camera, a black box camera, etc. In addition, according to an embodiment of the disclosure, the camera 33 may include an infrared camera.

The camera 33 may obtain background information of the vehicle regarding objects in the background, terrain, and road outside the vehicle. The camera 33 may obtain an image of the vehicle's surroundings, and the CPU 3 may identify, in the obtained image, buildings, mountains, other vehicles, pedestrians, lanes, headlights, and street trees located within preset distances away from the vehicle.

According to an embodiment of the disclosure, the CPU 3 controls at least some of the operations and functions of the vehicle-based computing system 1. The CPU 3 may be connected to a non-permanent storage and a permanent storage. For example, the non-permanent storage may be the RAM 5, and the permanent storage may be the HDD 7 or flash memory.

The CPU 3 may receive a user input that allows a user to interact with the CPU 3. For example, the vehicle-based computing system 1 may include at least one of the microphone 29, an auxiliary input 25, the input interface 52, a universal serial bus (USB) input 23, a GPS location input 24, or a Bluetooth input 15. The vehicle-based computing system 1 may further include an input selector 51 for selecting an input method so as to receive various inputs from the user. An analog input received from the microphone 29 and the auxiliary input 25 may be converted into a digital signal by an analog-to-digital (A/D) converter 27 before being transmitted to the CPU 3. Furthermore, although not shown in FIG. 6, numerous vehicle components and auxiliary components may use a vehicle network (e.g., including, but not limited to, a controller area network (CAN) bus) to communicate with the vehicle-based computing system 1.

In addition, the vehicle-based computing system 1 may include a display 4 and a speaker 13 as outputs. The speaker 13 may be connected to an amplifier 11 and may receive an audio output signal from the CPU 3 through a digital-to-analog (D/A) converter 9. Furthermore, an output of the vehicle-based computing system 1 may be provided through an external device connected via USB or Bluetooth, such as a user navigation device 54 that is a personal navigation device or a vehicle navigation device 60.

The vehicle-based computing system 1 may include a display 4. The display 4 may display information processed by the vehicle-based computing system 1. When the display 4 and a touchpad form a cross-layer structure to construct a touch screen, the display 4 may be used as an input device in addition to an output device. For example, the display 4 may include a transparent display or a head-up display.

The vehicle-based computing system 1 may receive data from at least one of another vehicle, a user mobile device 53, a base station 57, or a server.

According to an embodiment of the disclosure, the vehicle-based computing system 1 may use a Bluetooth transceiver 15 to communicate with the user mobile device 53 (e.g., a cellular phone, a smart phone, a personal digital assistant (PDA) or any other device having wireless Bluetooth connectivity). The user mobile device 53 may be, for example, a device held by a passenger in the vehicle. The user mobile device 53 may communicate with a network 61 outside the vehicle through communication with a base station 57. For example, the base station 57 may be a base station supporting cellular communication or a WiFi access point.

Pairing the Bluetooth transceiver 15 of the vehicle-based computing system 1 and the user mobile device 53 may be initiated by a user input received via the input interface 52 such as a button. Thus, the CPU 3 may be instructed that the Bluetooth transceiver 15 will be paired with a Bluetooth transceiver in the user mobile device 53.

The CPU 3 may communicate with the network 61 via the user mobile device 53 or directly with the network 61 by using a built-in modem 63 having an antenna 18. For example, the built-in modem 63 may be a USB cellular modem supporting cellular communication.

According to an embodiment of the disclosure, the CPU 3 may execute an operating system (OS) in order to provide an application interface (API) for communicating with modem application software. The modem application software may access an embedded module or firmware on the Bluetooth transceiver 15 to complete wireless communication with a Bluetooth transceiver mounted to an external device such as the user mobile device 53. Bluetooth is a technology included in the IEEE 802 personal area network (PAN) protocols. IEEE 802 local area network (LAN) protocols include WiFi and have considerable cross-functionality with the IEEE 802 PAN. In addition to Bluetooth or WiFi, free-space optical communication (such as infrared data association (IrDA)) may be used for wireless communication within the vehicle.

According to another embodiment of the disclosure not illustrated in FIG. 6, the user mobile device 53 may be replaced with a cellular communication device installed in an electronic device 31 mounted to the vehicle.

Input data fed to the vehicle-based computing system 1 may be transmitted to the CPU 3 that is an internal processor of the vehicle via the user mobile device 53 and the Bluetooth transceiver 15. For example, the input data may be stored on the HDD 7 or other storage media until the input data is no longer needed.

As an additional source that may interface with the vehicle, the vehicle-based computing system 1 may include, for example, the user navigation device 54 having a USB connection 56 and/or an antenna 58, the vehicle navigation device 60 having a USB connection 62 or another connection, an onboard GPS 24, or a remote navigation system (not shown) having connectivity to the network 61. USB is one of a class of serial networking protocols. Most of the communication protocols used in the vehicle-based computing system 1 may be implemented to perform electrical or optical communication.

Furthermore, the CPU 3 may be in communication with various other auxiliary devices 65. The auxiliary devices 65 may be connected to the CPU 3 via a wireless connection through the antenna 67 or a wired USB connection 69. The auxiliary devices 65 may include, but are not limited to, personal media players, wireless health devices, portable computers, etc.

Furthermore, the CPU 3 may be connected to other devices via, for example, a wireless router 73 through a WiFi transceiver 71. In this case, the CPU 3 may connect to remote networks in the range of the local router 73.

According to an embodiment of the disclosure, at least some processes may be executed by a computing system in communication with the vehicle-based computing system 1. Such a computing system may include a wireless device (e.g., a mobile phone) or a remote computing system (e.g., a server) connected via the wireless device. Such computing systems may be collectively referred to as vehicle associated computing systems (VACS).

The electronic devices 200 according to certain embodiments of the disclosure have an advantage in that the optimal V2X technology may be selectively used by switching between the DSRC module 210 and the C-V2X module 220. Furthermore, because the DSRC module 210 and the C-V2X module 220 share an antenna therebetween, it is not necessary to separately provide an antenna for each V2X module, which reduces the space required for antennas mounted in the vehicle and the cost of the antennas. In addition, by reducing the number of antennas installed in the vehicle, it is possible to reduce not only the cost of antennas but also additional costs such as cost of cables used for connecting antennas to the TCU and labor cost associated with antenna installation.

Hereinafter, operation methods of the electronic device 200 according to certain embodiments of the disclosure will be described in more detail below with reference to FIGS. 7 through 12.

According to an embodiment of the disclosure, the electronic device 200 may be mounted to a vehicle to support wireless mobile communication for the vehicle. According to an embodiment of the disclosure, the electronic device 200 may be a separate device distinguishable from the vehicle, a device included in the vehicle, or at least a part of the electronic device 200 that controls the vehicle.

Figure 7:
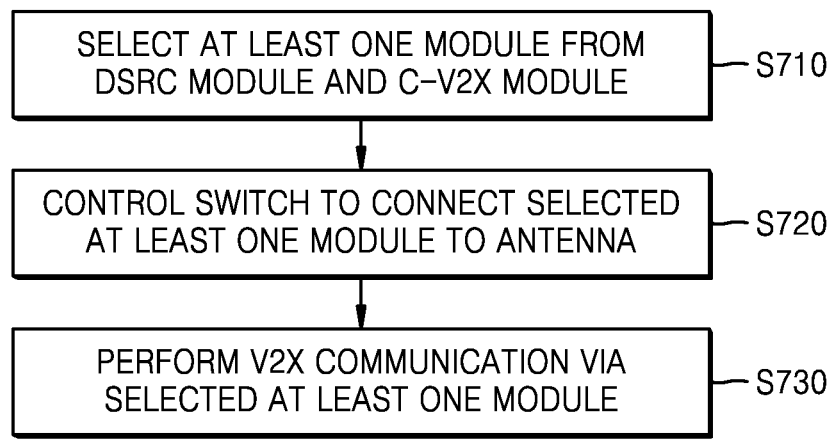
FIG. 7 is a flowchart of an operation method of an electronic device according to an embodiment of the disclosure.

FIG. 7 is a flowchart of an operation method of the electronic device 200 according to an embodiment of the disclosure.

According to an embodiment of the disclosure, the electronic device 200 may select at least one module from the DSRC module 210 for performing wireless communication using DSRC technology and the C-V2X module 220 for performing wireless communication using C-V2X technology (operation S710).

According to an embodiment of the disclosure, the electronic device 200 may select an optimal V2X communication technology according to various determination criteria and then a V2X module corresponding to the selected V2X communication technology. For example, the electronic device 200 may select an optimal V2X communication technology based on the location of the vehicle, the base station connected for cellular communication, the result of comparing periodically found DSRC and C-V2X signals, or surrounding environment information. Alternatively, the electronic device 200 may select the V2X communication technology corresponding to a user input.

For example, the electronic device 200 may obtain location information of the vehicle equipped with the electronic device 200 and select, based on the obtained location information, a module from the DSRC module 210 and the C-V2X module 220 as the module supporting the V2X communication technology corresponding to the current location of the vehicle. The electronic device 200 further obtains information about the V2X communication technology corresponding to the location of the vehicle and select, based on the information about the V2X communication technology corresponding to the location of the vehicle and the location information of the vehicle, a module from the DSRC module 210 and the C-V2X module 220 as the module supporting the V2X communication technology corresponding to the current location of the vehicle. The location information of the vehicle may include a GPS signal for the vehicle. The method of selecting the V2X communication technology based on location information of the vehicle will be described in more detail below with reference to FIG. 8.

As another example, the electronic device 200 may obtain information about a base station that is performing cellular communication with the electronic device 200 and select a module from the DSRC module 210 and the C-V2X module 220 as the module supporting the V2X communication technology corresponding to the base station. The electronic device 200 may further obtain information about the V2X communication technology corresponding to one or more base stations and select a module from the DSRC module 210 and the C-V2X module 220 as the module supporting the V2X communication technology corresponding to the currently connected base station, based on the information about the V2X communication technology corresponding to the one or more base stations and on the information about the base station that is currently performing cellular communication. The method of selecting the V2X communication technology based on base station information will be described in more detail below with reference to FIG. 9.

As another example, the electronic device 200 may select a module from the DSRC module 210 and the C-V2X module 220 as the module supporting optimal V2X communication technology by periodically comparing a DSRC signal received via the DSRC module 210 with a C-V2X signal received via the C-V2X module 220. The electronic device 200 may select one of the DSRC module 210 and the C-V2X module 220 by comparing at least one of PER, PRR, latency, or strength of each of the DSRC signal and the C-V2X signal to each other. The method of selecting V2X communication technology based on the result of comparing the DSRC signal with the C-V2X signal will be described in more detail below with reference to FIGS. 10 and 11.

As another example, the electronic device 200 may obtain surrounding environment information of the vehicle equipped with the electronic device 200 and select a module from the DSRC module 210 and the C-V2X module 220 based on the obtained surrounding environment information. The electronic device 200 may obtain an image by capturing the vehicle's surroundings and identify entities supporting V2I communication with the vehicle in the obtained image. For example, the entities supporting the V2I communication with the vehicle may include facilities such as traffic lights or street lights installed on or around the road on which the vehicle is traveling and a base station The electronic device 200 may select a module from the DSRC module 210 and the C-V2X module 220 as the module supporting the V2X communication technology corresponding to the identified entities. The method of selecting V2X communication technology based on surrounding environment information of the vehicle will be described in more detail below with reference to FIG. 12.

Furthermore, according to an embodiment of the disclosure, when V2X communication using a given V2X communication technology is interrupted, for stable V2X communication, the electronic device 200 may quickly switch to the other V2X communication technology for continuously performance of the V2X communication.

When wireless communication using a particular V2X communication technology in service is interrupted, the electronic device 200 may select the V2X module supporting the other V2X communication technology.

When communication via a certain V2X communication technology is interrupted, the electronic device 200 may determine whether it is appropriate to continuously perform V2X communication by switching to the other V2X communication technology. When the electronic device 200 determines that switching the V2X communication technology is desirable, the electronic device 200 may select the V2X module supporting the other V2X communication technology. On the other hand, when the electronic device 200 determines that switching the V2X communication technology is not desirable, the electronic device 200 may select the V2X module supporting the V2X communication technology that is currently interrupted. The electronic device 200 may perform an operation for reactivating a session using the currently-used V2X technology to maintain the use of the V2X communication technology used for the interrupted communication or wait for a preset time period until the interruption problem is solved.

According to an embodiment of the disclosure, the electronic device 200 may control the switch 240 to connect the selected at least one module to an antenna (operation S720). The electronic device 200 may control the processor 250 to transmit a control signal to the switch 240 and control the switch 240 to connect the selected module to the antenna with the control signal.

According to an embodiment of the disclosure, the electronic device 200 may perform V2X communication via the selected at least one module (operation S730). The electronic device 200 may perform diversity transmission and diversity reception of a V2X signal by simultaneously using a pair of sub-antennas included in the antenna.

Figure 8:
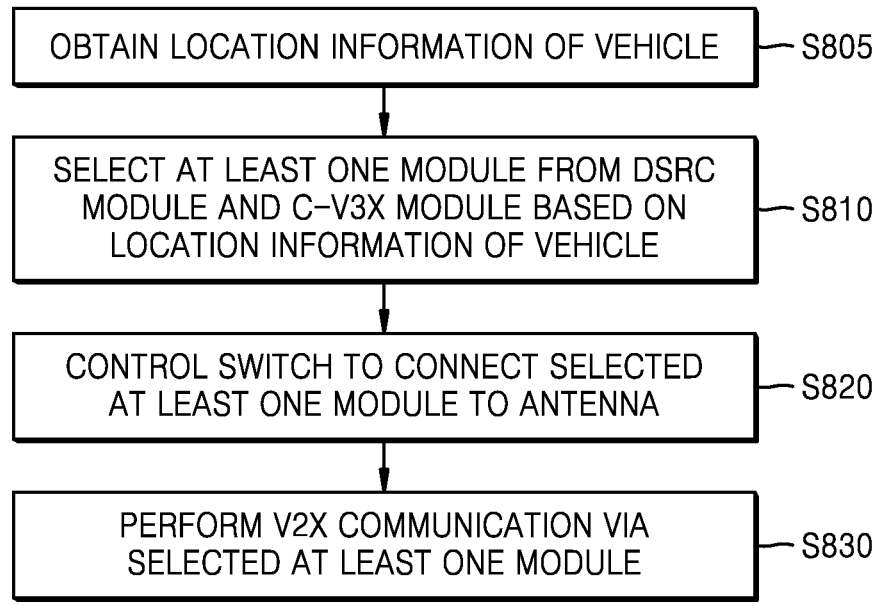
FIG. 8 is a flowchart of a method, performed by an electronic device, of selecting a V2X communication technology based on location information of a vehicle, according to an embodiment of the disclosure.

FIG. 8 is a flowchart of a method, performed by the electronic device 200, of switching a V2X communication technology based on location information of a vehicle, according to an embodiment of the disclosure.

According to an embodiment of the disclosure, the electronic device 200 may obtain location information of a vehicle (operation S805). The electronic device 200 may obtain location information of the vehicle when the vehicle starts up and starts travelling.

Location information of the vehicle may include longitude and latitude coordinates corresponding to the location of the vehicle, which is derived from a GPS signal, or the distance relative to a preset reference point (e.g., a nearby vehicle, surrounding infrastructure, etc.)

The electronic device 200 may obtain location information of the vehicle in preset periodic time periods or at preset distance intervals. For example, the electronic device 200 may obtain location information of the vehicle from a server, a base station, an infrastructure, or another electronic device mounted to another vehicle, which is in communication with the electronic device 200. Alternatively, the electronic device 200 may obtain location information of the vehicle from a navigation system mounted in the vehicle. Alternatively, the electronic device 200 may obtain location information of the vehicle by calculating the location of the vehicle based on a GPS signal from the GNSS module 580 included in the electronic device 200.

According to an embodiment of the disclosure, the electronic device 200 may select at least one module from the DSRC module 210 and the C-V2X module 220 based on the location information of the vehicle (operation S810).

The electronic device 200 may further obtain information about whether the area where the vehicle is located supports DSRC or C-V2X technology. The electronic device 200 may obtain this information from an external device or from an internal memory. The electronic device 200 may determine, based on the obtained information, the V2X communication technology supported in the area corresponding to the location information of the vehicle obtained in operation S805, and select at least one module from the DSRC module 210 and the C-V2X module 220 based on the determined V2X communication technology.

According to an embodiment of the disclosure, the electronic device 200 may control the switch 240 to connect the selected at least one module to an antenna (operation S820). The electronic device 200 may control the switch 240 to connect the selected module to the antenna by transmitting a control signal generated in the processor 250 to the switch 240.

According to an embodiment of the disclosure, the electronic device 200 may perform V2X communication via the selected at least one module (operation S830). The electronic device 200 may perform diversity transmission and diversity reception of a V2X signal by simultaneously using a pair of sub-antennas included in the antenna.

According to an embodiment of the disclosure, by consistently monitoring location information of the vehicle, when the supported V2X communication technology is changed according to a change in the location of the vehicle, the electronic device 200 may continuously perform V2X communication by switching to the V2X communication technology that is available in the area corresponding to the changed location of the vehicle.

Figure 9:
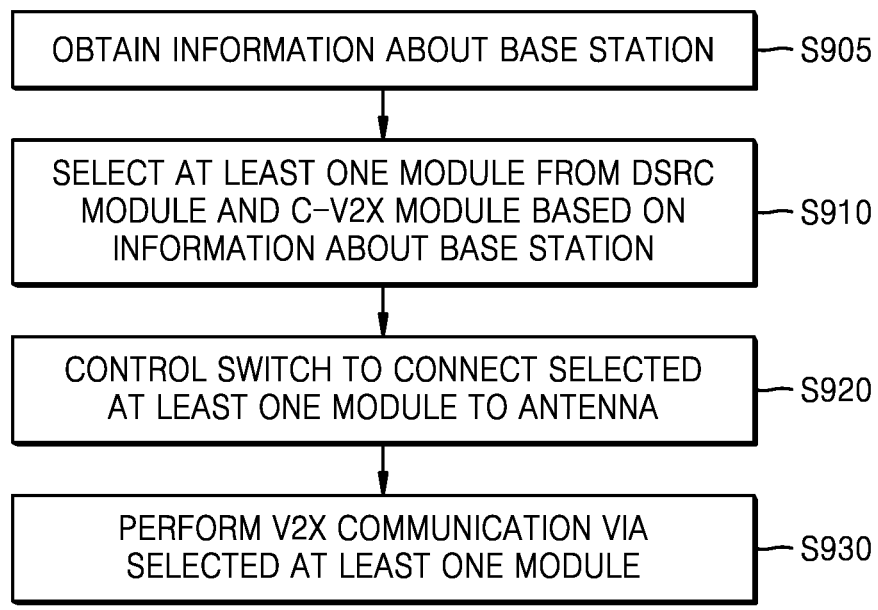
FIG. 9 is a flowchart of a method, performed by an electronic device, of selecting a V2X communication technology based on base station information, according to an embodiment of the disclosure.

FIG. 9 is a flowchart of a method, performed by the electronic device 200, of switching a V2X communication technology based on base station information, according to an embodiment of the disclosure.

According to an embodiment of the disclosure, the electronic device 200 may obtain information about a base station (operation S905). The electronic device 200 may further include an NAD module for cellular communication based on 3G, long-term evolution (LTE), 5G, etc., in addition to the DSRC module 210 and C-V2X module 220 for V2X communication. When the vehicle starts up and starts travelling, the electronic device 200 may obtain information about a base station that performs cellular communication with the electronic device 200.

Information about the base station may include location information of the base station, identification information of the base station, identification information of neighboring base stations, etc.

The electronic device 200 may obtain information about the base station periodically at preset time periods or at preset distance intervals. For example, the electronic device 200 may obtain information about the base station connected to the electronic device 200 directly from the base station or obtain information about the base station which is stored in an internal module such as a memory or NAD module.

According to an embodiment of the disclosure, the electronic device 200 may select at least one module from the DSRC module 210 and the C-V2X module 220 based on the information about the base station (operation S910).

For example, the electronic device 200 may further obtain information about whether the area within coverage of each base station supports DSRC or C-V2X technology. The electronic device 200 may obtain this information from an external device or from an internal memory. The electronic device 200 may determine, based on the obtained information, the V2X communication technology supported in the coverage area of the base station of which information is obtained in operation S905, and select at least one module from the DSRC module 210 and the C-V2X module 220 based on the determined V2X communication technology.

According to an embodiment of the disclosure, the electronic device 200 may control the switch 240 to connect the selected at least one module to an antenna (operation S920). The electronic device 200 may control the switch 240 to connect the selected module to the antenna by transmitting a control signal generated in the processor 250 to the switch 240.

According to an embodiment of the disclosure, the electronic device 200 may perform V2X communication via the selected at least one module (operation S930). The electronic device 200 may perform diversity transmission and diversity reception of a V2X signal by simultaneously using a pair of sub-antennas included in the antenna.

According to an embodiment of the disclosure, when handover between base stations occurs due to a change in the location of the vehicle, the electronic device 200 may continuously perform V2X communication by switching to the V2X communication technology that is available in the coverage area of the new base station.

Figure 10:
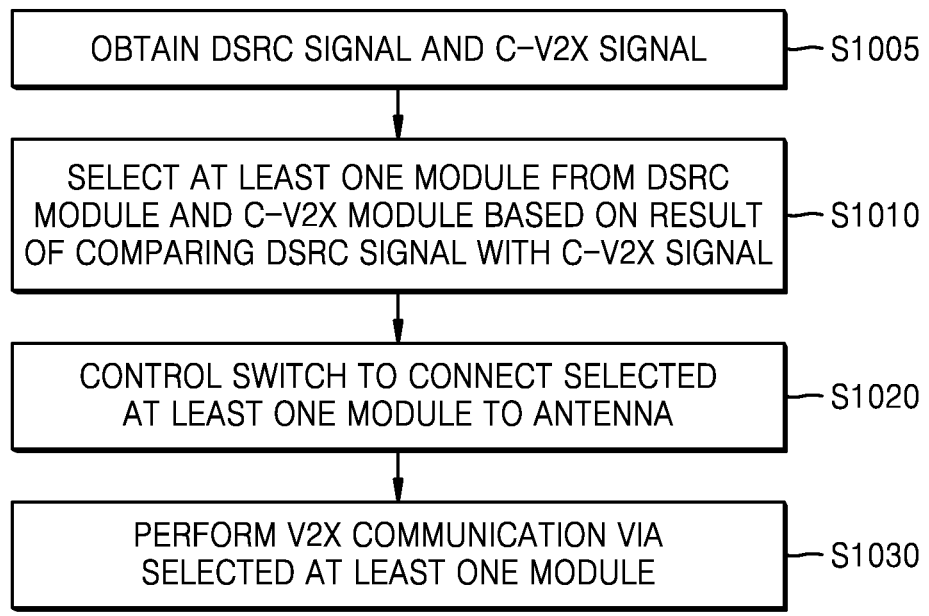
FIG. 10 is a flowchart of a method, performed by an electronic device, of selecting a V2X communication technology based on a result of comparing a dedicated short range communication (DSRC) signal with a cellular V2X (C-V2X) signal, according to an embodiment of the disclosure.

FIG. 10 is a flowchart of a method, performed by the electronic device 200, of switching a V2X communication technology based on a result of comparing a DSRC signal with a C-V2X signal, according to an embodiment of the disclosure. According to an embodiment of the disclosure, when the vehicle equipped with the electronic device 200 travels in an area where the two different V2X technologies, i.e., DSRC and C-V2X, are simultaneously used, the electronic device 200 may switch to the V2X technology that provides better V2X communication performance by periodically searching for a DSRC signal received via DSRC or a C-V2X signal received via C-V2X.

According to an embodiment of the disclosure, the electronic device 200 may obtain a DSRC signal and a C-V2X signal (operation S1005).

The electronic device 200 may normally perform diversity V2X communication via a first V2X communication technology by operating both sub-antennas. The electronic device 200 maintains the first V2X communication technology for one of the sub-antennas while periodically searching for a V2X signal of a second V2X communication technology by using the other sub-antenna.

According to an embodiment of the disclosure, the electronic device 200 may select at least one module from the DSRC module 210 and the C-V2X module 220 based on the result of comparing the DSRC signal with the C-V2X signal (operation S1010). The electronic device 200 may select the V2X module capable of achieving better performance by comparing at least one of PER, PRR, latency, or the strength of each of the DSRC signal and the C-V2X signal to each other.

According to an embodiment of the disclosure, the electronic device 200 may control the switch 240 to connect the selected at least one module to an antenna (operation S1020). The electronic device 200 may control the switch 240 to connect the selected module to the antenna by transmitting a control signal generated in the processor 250 to the switch 240.

According to an embodiment of the disclosure, the electronic device 200 may perform V2X communication via the selected at least one module (operation S1030). The electronic device 200 may perform diversity transmission and diversity reception of a V2X signal by simultaneously using the pair of sub-antennas included in the antenna.

According to an embodiment of the disclosure, by periodically searching for signals received via the second V2X communication technology while communicating in the first V2X communication technology, when a change in communication quality occurs, the electronic device 200 may continuously and seamlessly perform V2X communication by switching to the V2X communication technology that is expected to achieve higher performance.

Figure 11:
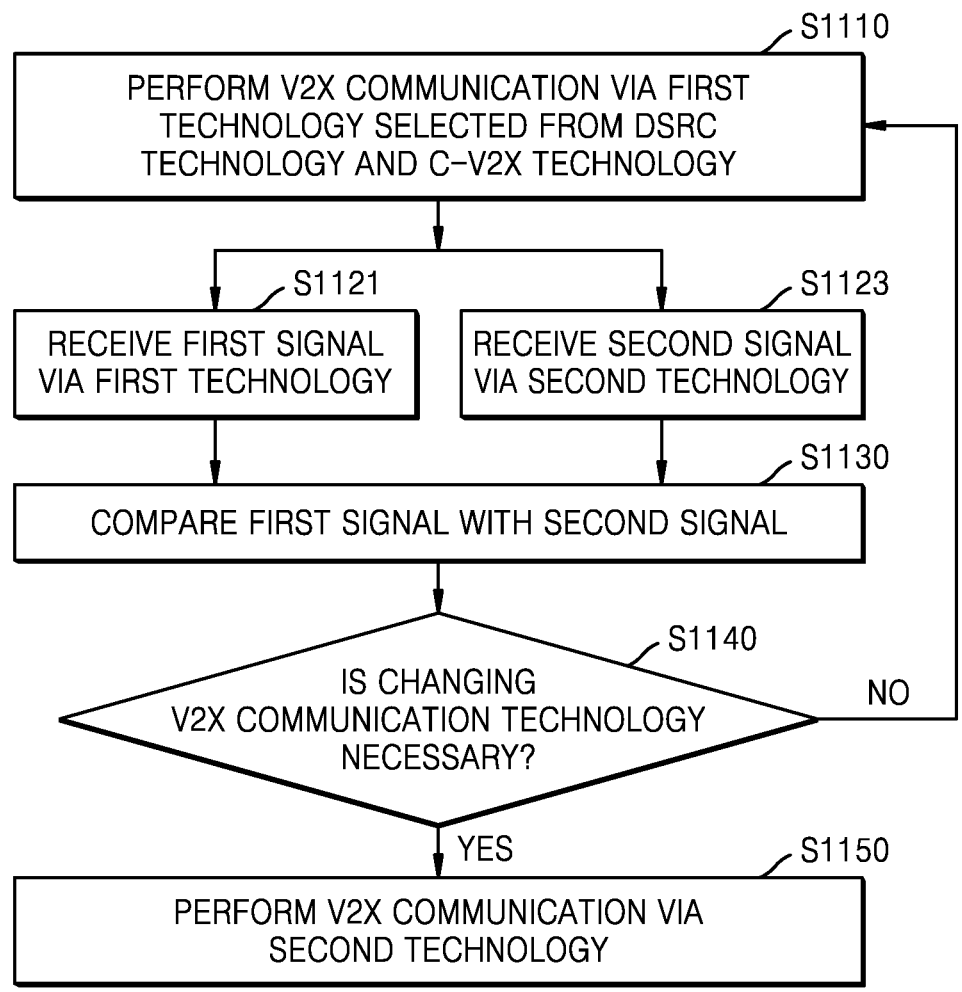
FIG. 11 is a flowchart of a method, performed by an electronic device, of switching a V2X communication technology by periodically searching for a DSRC signal and a C-V2X signal, according to an embodiment of the disclosure.

FIG. 11 is a flowchart of a method, performed by the electronic device 200, of switching a V2X communication technology by periodically searching for a DSRC signal and a C-V2X signal, according to an embodiment of the disclosure.

According to an embodiment of the disclosure, the electronic device 200 may perform V2X communication via a first technology selected from either DSRC technology or C-V2X technology (operation S1110). For convenience of description, the technology not selected is hereinafter referred to as the second technology. The electronic device 200 may perform diversity V2X communication by operating both sub-antennas. The electronic device 200 may determine whether to change the communication technology for better communication performance by periodically searching for signals received via the other technology.

The electronic device 200 may receive a first signal by maintaining V2X communication using the first technology for one of the pair of sub-antennas (operation S1121). The electronic device 200 may control the switch 240 to periodically search for a V2X signal that is received via the second technology for the other sub-antenna. The electronic device 200 may receive a second signal by performing V2X communication via the second technology with the other one of the pair of sub-antennas (operation S1123).

According to an embodiment of the disclosure, the electronic device 200 may compare the first signal with the second signal (operation S1130). The electronic device 200 may determine whether changing the V2X communication technology is necessary by comparing at least one of PER, PRR, latency, or the strength of each of the first and second signals to each other (operation S1140).

For example, when the PER of the first signal is greater than the PER of the second signal, the electronic device 200 may determine that the V2X communication technology needs to be changed from the first technology to the second technology. In contrast, when the PER of the first signal is less than or equal to the PER of the second signal, the electronic device 200 may determine that the first technology should be maintained. Alternatively, when the PRR of the first signal is less than the PRR of the second signal, the electronic device 200 may determine that the V2X communication technology needs to be changed from the first technology to the second technology. In contrast, when the PRR of the first signal is greater than or equal to the PRR of the second signal, the electronic device 200 may determine that the first technology should be maintained. When the latency of the first signal is longer than the latency of the second signal, the electronic device 200 may determine that the V2X communication technology needs to be changed from the first technology to the second technology. In contrast, when the latency of the first signal is shorter than or equal to the latency of the second signal, the electronic device 200 may determine that the first technology should be maintained. Alternatively, when the magnitude of the first signal is less than the magnitude of the second signal, the electronic device 200 may determine that the V2X communication technology needs to be changed from the first technology to the second technology. In contrast, when the magnitude of the first signal is greater than or equal to the magnitude of the second signal, the electronic device 200 may determine that the first technology should be maintained.

According to an embodiment of the disclosure, when changing the V2X communication technology is not determined to be necessary, the electronic device 200 may return to operation S1110 to continuously perform V2X communication using the first technology. On the other hand, when changing the V2X communication technology is determined to be necessary, the electronic device 200 may perform V2X communication via the V2X module supporting the second technology by controlling the switch 240 to connect the V2X module supporting the second technology to an antenna (operation S1150).

Figure 12:
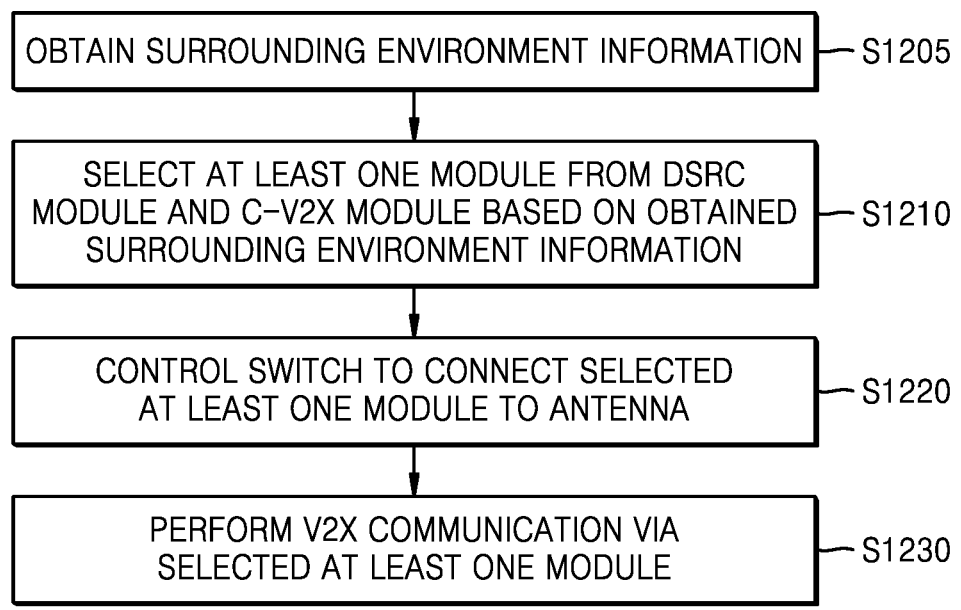
FIG. 12 is a flowchart of a method, performed by an electronic device, of selecting a V2X communication technology based on surrounding environment information, according to an embodiment of the disclosure.

FIG. 12 is a flowchart of a method, performed by the electronic device 200, of switching a V2X communication technology based on surrounding environment information, according to an embodiment of the disclosure.

According to an embodiment of the disclosure, the electronic device 200 may obtain surrounding environment information of the vehicle (operation S1205). The electronic device 200 may periodically obtain surrounding environment information while the vehicle is travelling.

For example, the surrounding environment information of the vehicle may include at least one of a captured image of the vehicle's surrounding environment, depth information obtained by sensing the depth of an object located in the vicinity of the vehicle, or information received from of other surrounding vehicles.

The electronic device 200 may obtain a captured image of the vehicle's surrounding environment at preset time periods or preset distance intervals. For example, the electronic device 200 may obtain an image including buildings, mountains, other vehicles, pedestrians, lanes, headlights, and street trees located within a certain distance from the vehicle.

According to an embodiment of the disclosure, the electronic device 200 may select at least one module from the DSRC module 210 and the C-V2X module 220 based on the surrounding environment information of the vehicle (operation S1210).

The electronic device 200 may identify entities supporting V2I communication with the vehicle in the image of the vehicle's surrounding environment and select a module from the DSRC module 210 and the C-V2X module 220 as the module supporting the V2X communication technology corresponding to the identified entities. According to an embodiment of the disclosure, the electronic device 200 may use AI to identify the entity in the image.

According to various embodiments of the disclosure, the electronic device 200 may use AI to support wireless mobile communication for the vehicle. For example, as explained above, AI may be used to analyze surrounding environment information and prompt a change of communication technology.

According to the disclosure, functions related to AI may operate via a processor and a memory. The processor may be configured as one or a plurality of processors. In this case, the one or plurality of processors may be a general-purpose processor such as a CPU, an application processor (AP), or a digital signal processor (DSP), a dedicated graphics processor such as a GPU or a vision processing unit (VPU), or a dedicated AI processor such as a neural processing unit (NPU). The one or plurality of processors may control input data to be processed according to predefined operation rules or an AI model stored in the memory. Alternatively, when the one or more processors are a dedicated AI processor, the dedicated AI processor may be designed with a hardware structure specialized for processing a particular AI model.

The predefined operation rules or AI model may be created via a training process. In this case, creation via the training process means that the predefined operation rules or AI model set to perform desired characteristics (or purpose) are created by training a basic AI model based on a large number of training data via a learning algorithm. The training process may be performed by an apparatus itself in which AI is performed or via a separate server and/or system. Examples of a learning algorithm may include, but are not limited to, supervised learning, unsupervised learning, semi-supervised learning, and reinforcement learning.

An AI model may include a plurality of neural network layers. Each of the neural network layers has a plurality of weight values and may perform neural network computations via calculations between a result of computations in a previous layer and a plurality of weight values. A plurality of weight values assigned to each of the neural network layers may be optimized based on a result of training the AI model. For example, a plurality of weight values may be modified to reduce or minimize a loss or cost value obtained by the AI model during a training process. An artificial neural network may include a deep neural network (DNN) and may be, for example, a convolutional neural network (CNN), a DNN, an RNN, a restricted Boltzmann machine (RBM), a deep belief network (DBN), a bidirectional recurrent DNN (BRDNN), or deep Q-networks (DQN) but is not limited thereto.

According to an embodiment of the disclosure, the electronic device 200 may control the switch 240 to connect the selected at least one module to an antenna (operation S1220). The electronic device 200 may control the switch 240 to connect the selected module to the antenna by transmitting a control signal generated in the processor 250 to the switch 240.

According to an embodiment of the disclosure, the electronic device 200 may perform V2X communication via the selected at least one module (operation S1230). The electronic device 200 may perform diversity transmission and diversity reception of a V2X signal by simultaneously using a pair of sub-antennas included in the antenna.

According to an embodiment of the disclosure, by consistently monitoring surrounding environment information of the vehicle, when a supported V2X communication technology is changed according to a change in the vehicle's surrounding environment, the electronic device 200 may continuously perform V2X communication by switching to the supported V2X communication technology based on the change in the vehicle's surrounding environment.

Figure 13:
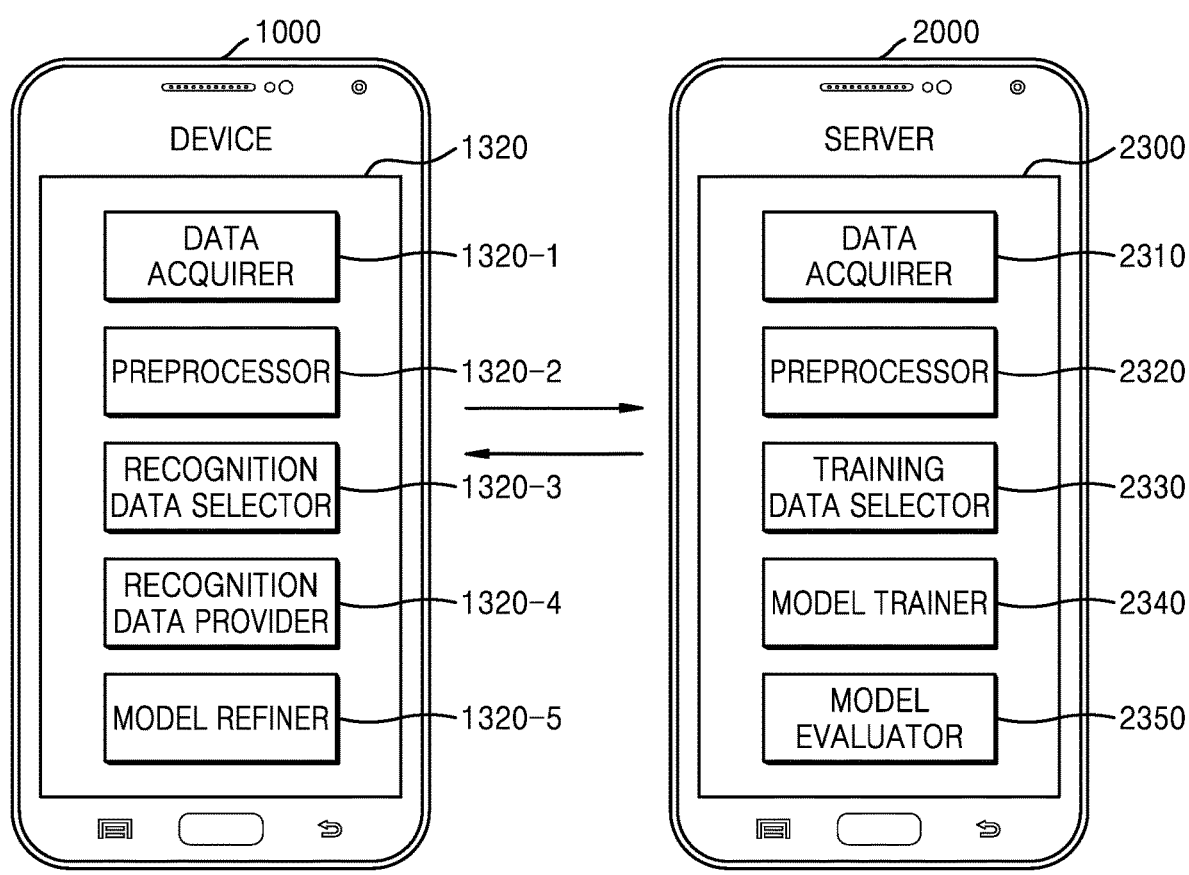
FIG. 13 is a view illustrating an example in which an electronic device and a server interwork together to learn and recognize data, according to an embodiment of the disclosure.

FIG. 13 is a view illustrating an example in which a device 1000 and a server 2000 interwork together to learn and recognize data, according to an embodiment of the disclosure.

According to an embodiment of the disclosure, the electronic device 200 or the vehicle-based computing system 1 may interwork with the server 2000 to support wireless mobile communication by using AI. For example, the electronic device 200 or the vehicle-based computing system 1 may use AI for analyzing surrounding environment information to change the V2X communication technology. The device 1000 of FIG. 13 may correspond to the electronic device 200 or the processor 250 of the electronic device 200, or the vehicle-based computing system 1 or the CPU 3 of the vehicle-based computing system 1.

Referring to FIG. 13, the server 2000 may learn criteria for determining a situation and/or selecting the V2X communication technology, and the device 1000 may determine a situation based on the result of the learning by the server 2000.

According to an embodiment of the disclosure, a data learner 2300 included in the server 2000 may learn criteria for determining a situation and/or selecting the V2X communication technology. The data learner 2300 may learn criteria with respect to which data will be used to determine the situation or select the V2X communication technology and how to determine the situation or select the V2X communication technology by using data. The data learner 2300 may acquire data to be used for training and learn criteria for determining the situation and/or selecting the V2X communication technology by applying the acquired data to a data recognition model.

According to an embodiment of the disclosure, a data recognizer 1320 included in the device 1000 may determine a situation or select the V2X communication technology based on data. The data recognizer 1320 may recognize the situation from data by using a trained data recognition model. The data recognizer 1320 may acquire data according to the learned preset criteria and determine the situation or select the V2X communication technology based on the data by using the data recognition model that takes the acquired data as an input value. Furthermore, a resultant value output by the data recognition model that takes the acquired data as an input value may be used to modify and refine the data recognition model.

At least one of the data learner 2300 or the data recognizer 1320 may be fabricated in the form of at least one hardware chip that may be mounted in an electronic device. For example, at least one of the data learner 2300 or the data recognizer 1320 may be manufactured in the form of a dedicated hardware chip for AI or as part of an existing general-purpose processor (e.g., a CPU or AP) or dedicated graphics processor (e.g., a GPU) and may be mounted in various electronic devices as described above.

The data learner 2300 and the data recognizer 1320 may be connected to each other via a wire or wirelessly such that model information generated by the data learner 2300 may be provided to the data recognizer 1320 and data input to the data recognizer 1320 may be provided to the data learner 2300 as additional training data.

In addition, at least one of the data learner 2300 or the data recognizer 1320 may be implemented as a software module. When the at least one of the data learner 2300 or the data recognizer 1320 is implemented as a software module (or a program module including instructions), the software module may be stored in non-transitory computer readable recording media. Furthermore, in this case, at least one software module may be provided by an OS or application. Alternatively, some of the at least one software module may be provided by the OS while the rest thereof may be provided by the application.

According to an embodiment of the disclosure, the data learner 2300 may include a data acquirer 2310, a preprocessor 2320, a training data selector 2330, a model trainer 2340, and a model evaluator 2350.

The data acquirer 2310 may acquire data necessary for determining the situation and/or selecting the V2X communication technology.

For example, the data acquirer 2310 may receive a still image or video. The video may be composed of a plurality of images (or frames). For example, the data acquirer 2310 may receive a video via an external camera (e.g., closed circuit television (CCTV) or black box camera). In this case, the camera may include one or more image sensors (e.g., front sensor or rear sensor), a lens, an image signal processor (ISP), or a flash (e.g., an LED or xenon lamp). As another example, the data acquirer 2310 may receive a video stored in an external memory from the external memory.

The preprocessor 2320 may preprocess the acquired data such that the acquired data may be used in training for determination of the situation and/or selection of the V2X communication technology. The preprocessor 2320 may process data acquired for training into a preset format such that the model trainer 2340 to be described later may use the acquired data.

The training data selector 2330 may select data necessary for training from among the preprocessed data. The selected data may be provided to the model trainer 2340. The training data selector 2330 may select data necessary for training from among the preprocessed data according to preset criteria. Furthermore, the training data selector 2330 may select data according to preset criteria learned by the model trainer 2340 to be described later.

The model trainer 2340 may learn a criterion with respect to how to determine the situation or which V2X communication technology is to be selected based on training data. Furthermore, the model trainer 2340 may learn a criterion with respect to which training data is to be used for determining the situation and/or selecting the V2X communication technology.

For example, the model trainer 2340 may learn a criterion for identifying a certain entity in an image by learning images. As another example, by learning vehicle driving information, the model trainer 2340 may learn a criterion for selecting an optimal V2X communication technology based on location information of the vehicle, information about a base station connected for cellular communication, the result of comparing periodically found DSRC and C-V2X signals, or surrounding environment information.

Furthermore, the model trainer 2340 may use training data to train a data recognition model used for determining the situation and/or selecting the V2X communication technology. In this case, the data recognition model may be a previously generated model. For example, the data recognition model may be a model previously generated by receiving basic training data (e.g., sample images, information about an optimal V2X communication technology determined according to the location of a vehicle, etc.).

The data recognition model may be built by taking into account an application field of the data recognition model, an objective of learning, or computer performance of a device running the data recognition model. For example, the data recognition model may be a model based on a neural network. Models such as convolutional neural network (CNN), deep neural network (DNN), recurrent neural network (RNN), and bidirectional recurrent DNN (BRDNN) may be used as the data recognition model, but the data recognition model is not limited thereto.

For example, the model trainer 2340 may train a data recognition model for recognizing an object included in an image by using previously obtained images. As another example, the model trainer 2340 may train a data recognition model for selecting an optimal V2X communication technology according to the location of a vehicle by using vehicle driving information.

The model evaluator 2350 may input evaluation data to the data recognition model and cause the model trainer 2340 to train again the data recognition model when a recognition result obtained from the evaluation data does not satisfy a preset criterion. In this case, the evaluation data may be preset data for evaluating the data recognition model. For example, the evaluation data may include data related to accuracy of an entity identified in an image or data obtained by comparing periodically found DSRC and C-V2X signals with each other.

For example, when the number or ratio of pieces of evaluation data with respect to which recognition results are not accurate from among recognition results output from the trained data recognition model with respect to evaluation data exceeds a preset threshold, the model evaluator 2350 may evaluate that the preset criterion is not satisfied. For example, when the preset criterion is defined as a ratio of 2%, and when the trained data recognition model outputs wrong recognition results with respect to more than 20 pieces of evaluation data among a total of 1000 pieces of evaluation data, the model evaluator 2350 may evaluate the trained data recognition model as not being suitable.

At least one of the data acquirer 2310, the preprocessor 2320, the training data selector 2330, the model trainer 2340, or the model evaluator 2350 in the data learner 2300 may be fabricated in the form of at least one hardware chip that may be mounted in an electronic device. For example, at least one of the data acquirer 2310, the preprocessor 2320, the training data selector 2330, the model trainer 2340, or the model evaluator 2350 may be manufactured in the form of a dedicated hardware chip for AI or as part of an existing general-purpose processor (e.g., a CPU or AP) or dedicated graphics processor (e.g., a GPU) and may be mounted in various electronic devices as described above.

In addition, at least one of the data acquirer 2310, the preprocessor 2320, the training data selector 2330, the model trainer 2340, or the model evaluator 2350 may be implemented as a software module. When the at least one of the data acquirer 2310, the preprocessor 2320, the training data selector 2330, the model trainer 2340, or the model evaluator 2350 is implemented as a software module (or a program module including instructions), the software module may be stored in non-transitory computer readable recording media. Furthermore, in this case, at least one software module may be provided by an OS or application. Alternatively, some of the at least one software module may be provided by the OS while the rest thereof may be provided by the application.

Moreover, referring to FIG. 13, according to an embodiment of the disclosure, the data recognizer 1320 may include a data acquirer 1320-1, a preprocessor 1320-2, a recognition data selector 1320-3, a recognition result provider 1320-4, and a model refiner 1320-5.

The data acquirer 1320-1 may acquire data necessary for determining the situation and/or selecting the V2X communication technology. The preprocessor 1320-2 may preprocess the acquired data such that the acquired data may be used for determining the situation and/or selecting the V2X communication technology. The preprocessor 1320-2 may process the acquired data into a preset format such that the recognition result provider 1320-4 to be described later may use the acquired data.

The recognition data selector 1320-3 may select data necessary for determining a situation and/or selecting a V2X communication technology from among the preprocessed data. The selected data may be provided to the recognition result provider 1320-4. The recognition data selector 1320-3 may select some or all of the preprocessed data according to preset criteria for determining the situation and/or selecting the V2X communication technology. Furthermore, the recognition data selector 1320-3 may select data according to the preset criteria learned by the model trainer 2340.

The recognition result provider 1320-4 of the device 1000 may determine the situation and/or select the V2X communication technology by applying data selected by the recognition data selector 1320-3 to the data recognition model generated by the server 2000. The recognition result provider 1320-4 may provide a recognition result according to the purpose of data recognition. The recognition result provider 1320-4 may apply the data selected by the recognition data selector 1320-3 to the data recognition model by using the selected data as an input value. Furthermore, the recognition result may be determined by the data recognition model.

For example, the recognition result provider 1320-4 may provide the result of recognizing an object included in a still image or video. The recognition result provider 1320-4 may obtain an image of surroundings and determine a surrounding situation via image processing. The recognition result provider 1320-4 may obtain a captured image of the vehicle's surroundings and identify entities supporting V2I communication with the vehicle in the obtained image.

As another example, the recognition result provider 1320-4 may select an optimal V2X communication technology based on location information of the vehicle, information about a base station connected for cellular communication, the result of comparing periodically found DSRC and C-V2X signals, or surrounding environment information.

The model refiner 1320-5 may modify and refine the data recognition model based on evaluation of the recognition result provided by the recognition result provider 1320-4. For example, the model refiner 1320-5 may cause the model trainer 2340 to modify and refine the data recognition model by providing the recognition result from the recognition result provider 1320-4 to the model trainer 2340.

At least one of the data acquirer 1320-1, the preprocessor 1320-2, the recognition data selector 1320-3, the recognition result provider 1320-4, or the model refiner 1320-5 may be fabricated in the form of at least one hardware chip that may be mounted in an electronic device. For example, at least one of the data acquirer 1320-1, the preprocessor 1320-2, the recognition data selector 1320-3, the recognition result provider 1320-4, or the model refiner 1320-5 may be manufactured in the form of a dedicated hardware chip for AI or as part of an existing general-purpose processor (e.g., a CPU or AP) or dedicated graphics processor (e.g., a GPU) and may be mounted in various electronic devices as described above.

In addition, at least one of the data acquirer 1320-1, the preprocessor 1320-2, the recognition data selector 1320-3, the recognition result provider 1320-4, or the model refiner 1320-5 may be implemented as a software module. When the at least one of the data acquirer 1320-1, the preprocessor 1320-2, the recognition data selector 1320-3, the recognition result provider 1320-4, or the model refiner 1320-5 is implemented as a software module (or a program module including instructions), the software module may be stored in non-transitory computer readable recording media. Furthermore, in this case, at least one software module may be provided by an OS or application. Alternatively, some of the at least one software module may be provided by the OS while the rest thereof may be provided by the application. Embodiments of the disclosure may be implemented as a software program including instructions stored in a computer-readable storage medium.

A computer may refer to a device configured to retrieve an instruction from a computer-readable storage medium and to operate in response to the retrieved instruction according to embodiments of the disclosure and may include a terminal device and a remote control device according to embodiments of the disclosure.

The computer-readable storage medium may be provided in the form of a non-transitory storage medium. In this regard, the term 'non-transitory' only means that the storage medium does not include a signal and is tangible, and the term does not distinguish between data that is semi-permanently stored and data that is temporarily stored in the storage medium.

In addition, electronic devices and operation methods thereof according to embodiments of the disclosure may be included in a computer program product when provided. The computer program product may be traded, as a product, between a seller and a buyer.

The computer program product may include a software program and a computer-readable storage medium having stored therein the software program. For example, the computer program product may include a product (e.g. a downloadable application) in the form of a software program electronically distributed by a manufacturer of the electronic device or through an electronic market (e.g., Google™, Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a terminal (e.g., a terminal device or remote control device), the computer program product may include a storage medium of the server or a storage medium of the terminal. Alternatively, in a case where a third device (e.g., a smartphone) that communicates with the server or the terminal is present, the computer program product may include a storage medium of the third device. Alternatively, the computer program product may include a software program that is transmitted from the server to the terminal or the third device or that is transmitted from the third device to the terminal.

In this case, one of the server, the terminal, and the third device may execute the computer program product to perform methods according to embodiments of the disclosure. Alternatively, at least two of the server, the terminal, and the third device may execute the computer program product to perform the methods according to the embodiments of the disclosure in a distributed manner.

For example, the server (e.g., a cloud server, an AI server, or the like) may execute the computer program product stored in the server to control the terminal communicating with the server to perform the methods according to the embodiments of the disclosure.

As another example, the third device may execute the computer program product to control the terminal communicating with the third device to perform the methods according to the embodiments of the disclosure. In more detail, the third device may remotely control a terminal device or remote control device to transmit or receive a packed image.

In a case where the third device executes the computer program product, the third device may download the computer program product from the server and execute the downloaded computer program product. Alternatively, the third device may execute the computer program product that is pre-loaded therein to perform the methods according to the embodiments of the disclosure.

In a geographical area where different V2X communication technologies are available simultaneously or where regions using the different V2X communication technologies are located adjacent to each other, a technology capable of achieving better V2X communication performance may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device mounted to a vehicle to support wireless mobile communication for the vehicle, the electronic device comprising:
    a dedicated short range communication (DSRC) module configured to perform wireless communication by using DSRC technology;
    a cellular vehicle-to-everything (C-V2X) module configured to perform wireless communication by using C-V2X technology;
    an antenna;
    a switch; and
    a processor configured to control the switch to connect the DSRC module or the C-V2X module to the antenna,
    wherein the antenna includes a pair of sub-antennas for diversity transmission and diversity reception, and
    wherein the switch is configured to receive two output signals from the DSRC module for the pair of sub-antennas or two output signals from the C-V2X module for the pair of sub-antennas and output two signals to the pair of sub-antennas.

2. The electronic device of claim 1, further comprising a telematics control unit (TCU).

3. The electronic device of claim 1, wherein each of the DSRC module and the C-V2X module includes a V2X modem and a radio frequency (RF) transceiver.

4. The electronic device of claim 1, wherein the processor is further configured to:
    select a module from the DSRC module and the C-V2X module based on location information of the vehicle; and
    control the switch to connect the module selected from the DSRC module and the C-V2X module to the antenna.

5. The electronic device of claim 4, wherein the location information of the vehicle includes a global positioning system (GPS) signal for the vehicle,
    wherein the module selected from the DSRC module and the C-V2X module is selected based on information about a V2X communication technology corresponding to a location of the vehicle and the location information of the vehicle, and
    wherein the module selected from the DSRC module and the C-V2X module supports a V2X communication technology corresponding to a current location of the vehicle.

6. The electronic device of claim 1, wherein the processor is further configured to:
    select a module from the DSRC module and the C-V2X module based on information about a base station that is performing cellular communication with the electronic device; and
    control the switch to connect the module selected from the DSRC module and the C-V2X module to the antenna.

7. The electronic device of claim 6, wherein the module selected from the DSRC module and the C-V2X module is selected based on information about a V2X communication technology corresponding to the base station and the information about the base station, and
    wherein the module selected from the DSRC module and the C-V2X module supports the V2X communication technology corresponding to the base station.

8. The electronic device of claim 1, wherein the processor is further configured to:
    select a module from the DSRC module and the C-V2X module by periodically comparing a DSRC signal received via the DSRC module with a C-V2X signal received via the C-V2X module; and
    control the switch to connect the module selected from the DSRC module and the C-V2X module to the antenna.

9. The electronic device of claim 8, wherein the module selected from the DSRC module and the C-V2X module is selected based on comparing packet error rate (PER), packet reception rate (PRR), latency, and/or strength of the DSRC signal and the C-V2X signal to each other.

10. The electronic device of claim 9, wherein the processor is further configured to:
    control the switch to perform diversity communication by using one of the DSRC module and the C-V2X module and the pair of sub-antennas included in the antenna;
    control the switch to receive the DSRC signal via a first sub-antenna of the pair of sub-antennas and the C-V2X signal via a second sub-antenna at preset time periods; and
    determine whether to change V2X communication technology based on a result of the comparing the DSRC signal with the C-V2X signal.

11. The electronic device of claim 1, wherein the processor is further configured to:
    obtain surrounding environment information and select a module from the DSRC module and the C-V2X module based on the obtained surrounding environment information; and
    control the switch to connect the module selected from the DSRC module and the C-V2X module to the antenna.

12. The electronic device of claim 1, wherein the processor is further configured to:
    obtain a captured image of the vehicle's surrounding environment as surrounding environment information; and
    identify, in the captured image, an entity supporting vehicle-to-infrastructure (V2I) communication with the vehicle and select a module from the DSRC module and the C-V2X module as a module supporting a V2X communication technology corresponding to the identified entity.

13. An operation method of an electronic device mounted to a vehicle to support wireless mobile communication for the vehicle, the operation method comprising:

selecting a module from a dedicated short range communication (DSRC) module configured to perform wireless communication by using DSRC technology and a cellular vehicle-to-everything (C-V2X) module configured to perform wireless communication by using C-V2X technology;

controlling a switch to connect the selected module to an antenna; and performing V2X communication via the selected module, wherein the antenna includes a pair of sub-antennas for diversity transmission and diversity reception, and wherein the method further comprises:

receiving two output signals from the DSRC module for the pair of sub-antennas or two output signals from the C-V2X module for the pair of sub-antennas; and outputting two signals to the pair of sub-antennas.

14. The operation method of claim 13, wherein location information of the vehicle includes a global positioning system (GPS) signal for the vehicle, wherein the selecting of the module further comprises:

obtaining the location information of the vehicle; and selecting the module from the DSRC module and the C-V2X module based on information about a V2X communication technology corresponding to a location of the vehicle and the location information of the vehicle, and where the module selected from the DSRC module and the C-V2X module supports a V2X communication technology corresponding to a current location of the vehicle.

15. The operation method of claim 13, wherein the selecting of the module further comprises:

obtaining information about a base station that is performing cellular communication with the electronic device; and selecting the module from the DSRC module and the C-V2X module based on information about a V2X communication technology corresponding to the base station and the information about the base station, wherein the module selected from the DSRC module and the C-V2X module supports the V2X communication technology corresponding to the base station.

16. The operation method of claim 13, wherein the module selected from the DSRC module and the C-V2X module is selected based on periodically comparing a DSRC signal received via the DSRC module with a C-V2X signal received via the C-V2X module.

17. The operation method of claim 13, wherein the selecting of the module further comprises:

obtaining surrounding environment information of the vehicle; and selecting the module from the DSRC module and the C-V2X module based on the obtained surrounding environment information.

18. A non-transitory computer-readable recording medium having stored therein a program for performing an operation method of an electronic device mounted to a vehicle to support wireless mobile communication for the vehicle, the operation method comprising:

selecting a module from a dedicated short range communication (DSRC) module configured to perform wireless communication by using DSRC technology and a cellular vehicle-to-everything (C-V2X) module configured to perform wireless communication by using C-V2X technology;

controlling a switch to connect the selected module to an antenna; and performing V2X communication via the selected module, wherein the antenna includes a pair of sub-antennas for diversity transmission and diversity reception, and wherein the operation method further comprises:

receiving two output signals from the DSRC module for the pair of sub-antennas or two output signals from the C-V2X module for the pair of sub-antennas; and outputting two signals to the pair of sub-antennas.

* * * * *